United States Patent
Idem et al.

(10) Patent No.: US 12,508,536 B2
(45) Date of Patent: Dec. 30, 2025

(54) METHODS AND COMPOSITIONS FOR CARBON CAPTURE

(71) Applicant: Entropy Inc., Calgary (CA)

(72) Inventors: Raphael Idem, Regina (CA); Teeradet Supap, Regina (CA); Jessica Narku-Tetteh, Regina (CA); Pailin Muchan, Regina (CA); Paweesuda Natewong, Regina (CA)

(73) Assignee: Entropy Inc., Calgary (CA)

( * ) Notice: Subject to any disclaimer, the term of this patent is extended or adjusted under 35 U.S.C. 154(b) by 701 days.

(21) Appl. No.: 17/888,064

(22) Filed: Aug. 15, 2022

(65) Prior Publication Data

US 2023/0078337 A1    Mar. 16, 2023

Related U.S. Application Data

(60) Provisional application No. 63/235,802, filed on Aug. 22, 2021.

(51) Int. Cl.
*B01D 53/14* (2006.01)
*B01D 53/62* (2006.01)
*B01D 53/78* (2006.01)

(52) U.S. Cl.
CPC ..... *B01D 53/1493* (2013.01); *B01D 53/1475* (2013.01); *B01D 53/62* (2013.01); *B01D 53/78* (2013.01); *B01D 2252/103* (2013.01); *B01D 2252/20405* (2013.01); *B01D 2252/2041* (2013.01); *B01D 2252/20421* (2013.01); *B01D 2252/20426* (2013.01); *B01D 2252/20431* (2013.01); *B01D 2252/20484* (2013.01); *B01D 2252/504* (2013.01); *B01D 2257/504* (2013.01); *B01D 2258/0283* (2013.01)

(58) Field of Classification Search
CPC ........ B01D 53/1493; B01D 53/1475; B01D 53/62; B01D 53/78; B01D 2252/103; B01D 2252/20405; B01D 2252/2041; B01D 2252/20421; B01D 2252/20426; B01D 2252/20431; B01D 2252/20484; B01D 2252/504; B01D 2257/504; B01D 2258/0283; Y02C 20/40
See application file for complete search history.

(56) References Cited

FOREIGN PATENT DOCUMENTS

| | | | |
|---|---|---|---|
| JP | WO 2018043630 A1 * | 6/2019 | |
| KR | 101607051 B1 * | 3/2016 | ......... B01D 53/1493 |
| WO | WO-2012169634 A1 * | 12/2012 | ......... B01D 53/1425 |

OTHER PUBLICATIONS

Translation of JPWO_2018043630 (Year: 2019).*
Translation of KR_101607051 (Year: 2016).*
Translation of WO_2012169634_A1 (Year: 2012).*

* cited by examiner

*Primary Examiner* — Daniel Berns
*Assistant Examiner* — Joshua Maxwell Speer
(74) *Attorney, Agent, or Firm* — Berg Hill Greenleaf Ruscitti LLP

(57) ABSTRACT

A solvent composition for carbon capture according to a preferred embodiment comprises at least two of the following: diethylaminoethanol (DEAE), hexamethylenediamine (HMDA), and polyethylenimine (PEI). Another embodiment includes a method of performing carbon capture using the carbon capture solvent compositions described herein. Another embodiment provides an apparatus for performing carbon capture using the carbon capture compositions described herein and/or the carbon capture methods described herein.

14 Claims, 10 Drawing Sheets

METHODS AND COMPOSITIONS FOR CARBON CAPTURE

CROSS REFERENCE TO RELATED APPLICATIONS

This application claims the benefit of and priority to U.S. Provisional Application No. 63/235,802, filed Aug. 22, 2021. The entire specification and figures of the above-referenced application are hereby incorporated, in their entirety by reference.

FIELD OF INVENTION

This present disclosure relates generally to methods and compositions for carbon capture, more specifically, there is disclosed various solvents used in carbon capture and methods of using such.

BACKGROUND OF THE INVENTION

Carbon capture using aqueous amine solutions with chemical reaction has been adapted for treating dilute and low-pressure flue gases released from industrial processes. However, current amine-based carbon capture processes have several drawbacks. One drawback is the inability to provide high absorption and desorption rates of $CO_2$. Another drawback is the inability to achieve high $CO_2$ capture capacity while consuming a very small heat duty. Other drawbacks are specific to the type of amine used.

For example, primary amines such as monoethanolamine (MEA) form a very stable carbamate with $CO_2$ which requires a high regeneration energy in its break-down process. As another example, secondary amines such as diethanolamine (DEA) can directly react with NOx, a common impurity in fossil fuel fired flue gas, emitting potentially toxic nitrosamines with the off-gas. Tertiary amines such as methyldiethanolamine require less heat for regeneration compared to the other amines, but they still suffer from having a slow rate of reaction with $CO_2$, thus affecting the capture performance in terms of kinetics. Polyamines, such as piperazine (PZ), poses a threat because it is a secondary amine which can form nitrosamine emissions. All of these drawbacks can hinder the carbon capture process.

In addition, issues like amine loss by degradation, off-gas emission, amine volatilization, amine corrosion, and amine foaming often plague the carbon capture process. These operational issues can prevent a capture plant from achieving the original design conditions and performance goals. Emissions of degradation products can jeopardize an amine-based $CO_2$ capture plant itself by creating the possibility of unscheduled down times or even forcing the plant to shut down unnecessarily due to the plant being too toxic to continue to operate.

Therefore, there is a need to improve the efficiency associated with using amines and/or amine-based solutions in carbon capture, especially for treating dilute and low-pressure flue gases released from industrial processes. In particular, there is a need to develop new amine solvents that have one or more of the following desirable $CO_2$ capture properties: high absorption, high cyclic capacity, fast reaction kinetics, low corrosion, low degradation, and satisfactory heat duty requirements for solvent regeneration.

SUMMARY OF THE INVENTION

According to one aspect of the present invention, there is described methods and compositions for carbon capture. In some embodiments, the methods and compositions may be applied to capture carbon dioxide from the exhaust stream of hydrocarbon burning emitters.

According to one aspect of the present invention, there is provided a solvent for extracting carbon dioxide from a gaseous mixture, the solvent comprising diethylaminoethanol (DEAE), hexamethylenediamine (HMDA), and water.

According to one aspect of the present invention, there is provided a solvent for extracting carbon dioxide from a gaseous mixture, the solvent comprising DEAE, HMDA, and polyethylenimine (PEI).

According to a preferred embodiment of the present invention, DEAE is present in molar concentration ranging from 2.0M to 4.0M.

According to a preferred embodiment of the present invention, HMDA is present in molar concentration ranging from 0.1M to 1.0M.

According to a preferred embodiment of the present invention, PEI is present in molar concentration ranging from 0.001M to 0.5M.

According to a preferred embodiment of the present invention, the total molar concentration of the solvent is in the range of 2.10M to 5.5M.

According to a preferred embodiment of the present invention, the solvent consists essentially of diethylaminoethanol (DEAE), hexamethylenediamine (HMDA), polyethylenimine (PEI), and water.

Most preferably, in the present invention, DEAE is present in molar concentration of 3.6M, HMDA is present in molar concentration of 0.4M, and PEI is present in molar concentration of 0.01M.

According to a preferred embodiment of the present invention, the solvent has a heat duty below 160 KJ/mol $CO_2$.

More preferably, in the present invention, the solvent has a heat duty below 138.9 KJ/mol $CO_2$.

According to a preferred embodiment of the present invention, the solvent has an initial absorption rate greater than $$0.40 \frac{10^{-2} * kJ\, mol\, CO_2}{L.soltn * min}.$$

More preferably, in the present invention, the solvent has an initial absorption rate greater than $$0.48 \frac{10^{-2} * kJ\, mol\, CO_2}{L.soltn * min}.$$

According to a preferred embodiment of the present invention the solvent has an initial desorption rate greater than $$18.0 \frac{10^{-2} * kJ\, mol\, CO_2}{L.soltn * min}.$$

More preferably, in the present invention, the solvent has an initial desorption rate greater than $$20.40 \frac{10^{-2} * kJ\, mol\, CO_2}{L.soltn * min}.$$

According to a preferred embodiment of the present invention, the solvent has a cyclic capacity greater than $$1.05 \frac{\text{mol CO}_2}{\text{L.soltn}}.$$

More preferably, in the present invention, the solvent has a cyclic capacity is greater than $$1.20 \frac{\text{mol CO}_2}{\text{L.soltn}}.$$

According to a preferred embodiment of the present invention, the solvent has a lean loading of 0 at 110° C.

According to a preferred embodiment of the present invention, the solvent has a viscosity below 10 mPa·s at 30° C.

According to a preferred embodiment of the present invention, the solvent has an alkalinity in the range of 9.5 to 11.0 pKa at room temperature.

According to one aspect of the present invention, there is provided a solvent for extracting carbon dioxide from a gaseous mixture, the solvent comprising DEAE, HMDA, and PEI, wherein DEAE is present in molar concentration ranging from 3.6M to 4.5M and HMDA is present in molar concentration ranging from 0.15M to 0.5M.

More preferably, in the present invention, DEAE is present in molar concentration ranging from 3.3M to 3.9M, HMDA is present in molar concentration ranging from 0.3M to 0.5M, and PEI is present in molar concentration ranging from 0.005M to 0.015M.

Most preferably, in the present invention, PEI is present in molar concentration of 0.01M.

According to one aspect of the present invention, there is provided a method of performing carbon capture comprising collecting a flue gas comprising carbon dioxide from a flue gas emitting source and exposing the collected flue gas to a solvent according to a preferred embodiment of the present invention for a period of time sufficient to remove at least a portion of said carbon dioxide gas present in said flue gas.

According to one aspect of the present invention, there is provided an apparatus for performing carbon capture comprising components configured to perform a method of performing carbon capture comprising: collecting a flue gas, comprising carbon dioxide from a flue gas emitting source; and exposing the collected flue gas to a solvent according to a preferred embodiment of the present invention for a period of time sufficient to remove at least a portion of said carbon dioxide gas present in said flue gas.

According to one aspect of the present invention, there is provided a system for performing carbon capture comprising components configured to perform a method of performing carbon capture comprising: collecting a flue gas, comprising carbon dioxide from a flue gas emitting source; and exposing the collected flue gas to a solvent according to a preferred embodiment of the present invention for a period of time sufficient to remove at least a portion of said carbon dioxide gas present in said flue gas.

According to one aspect of the present invention, there is provided the use of a solvent according to a preferred embodiment of the present invention to perform carbon capture.

According to one aspect of the present invention, there is provided a solvent for extracting carbon dioxide from a gaseous mixture, the solvent comprising:
(a) a molar concentration in the range of 2.0M to 4.0M of compound I which is a tertiary amine, having a chemical formula of $(R_1)(R_2)N(C_nH_{2n}\text{—OH})$, where $R_1$ and $R_2$ are independently a linear or branched alkyl group with a carbon number between 1 to 6, and n is an integer between 1 to 6;
(b) a molar concentration in the range of 0.1M to 1.0M of compound II which comprises two primary amino groups, having a chemical formula of $NH_2\text{—}(C_mH_{2m})\text{—}NH_2$, where m is an integer between 2 to 10;
(c) a molar concentration in the range of 0.001M to 0.5M of a polyethyleneimine (PEI); and
(d) water.

According to a preferred embodiment of the present invention, compound I is a tertiary amine, having a chemical formula of $(R_1)(R_2)N(C_nH_{2n}\text{—OH})$, where $R_1$ and $R_2$ are independently a linear or branched alkyl group with a carbon number between 2 to 4.

According to a preferred embodiment of the present invention, compound I is a tertiary amine, having a chemical formula of $(R_1)(R_2)N(C_nH_{2n}\text{—OH})$, where $R_1$ and $R_2$ are independently a linear or branched alkyl group with a carbon number between 1 to 6, and n is an integer between 2 to 4.

According to a preferred embodiment of the present invention, compound II comprises two primary amino groups, having a chemical formula of $NH_2\text{—}(C_mH_{2m})\text{—}NH_2$, where m is an integer between 4 to 8.

According to one aspect of the present invention, there is provided a solvent that may be used for extracting carbon dioxide from a gaseous mixture. According to a preferred embodiment of the present invention, the solvent comprises one or more of diethylaminoethanol (DEAE), hexamethylenediamine (HMDA), polyethylenimine (PEI), and water.

In some preferred embodiments, the molar concentration of the DEAE is in the range of 2.0M to 4.0M. In some preferred embodiments, the molar concentration of the HMDA is in the range of 0.1M to 1.0M. In some preferred embodiments, the molar concentration of the PEI is in the range of 0.001M to 0.5M. In some preferred embodiments, the total molar concentration of the solvent is in the range of 2.101M to 5.5M. As the person skilled in the art will understand, the total molar concentration of the solvent refers to the concentration of the compounds which form the solvent while excluding water.

In some preferred embodiments, the solvent consists essentially of diethylaminoethanol (DEAE), hexamethylenediamine (HMDA), polyethylenimine (PEI), and water. In some preferred embodiments, the molar concentration of the DEAE is 3.6M, the molar concentration of the HMDA is 0.4M, and the molar concentration of the PEI is 0.01M.

According to a preferred embodiment of the present invention, the PEI is a branched PEI. According to a preferred embodiment of the present invention, the molar mass of the PEI ranges from 400 g/mol to 1200 g/mol. Preferably, the molar mass of the PEI ranges from 600 g/mol to 1000 g/mol. In some preferred embodiments, the molar mass for the PEI is approximately 800 g/mol.

In some preferred embodiments, the PEI has the CAS Registry Number CAS #25987-06-8.

In some preferred embodiments, the solvent has a viscosity below 10 mPa·s at 30° C. In some preferred embodiments, the solvent has an alkalinity in the range of 9.5 to 11.0 pKa at room temperature.

Advantageously, some preferred embodiments of the solvent may have a heat duty that is about 3.85 times lower than that of MEA. For example, some preferred embodiments of the solvent may have a heat duty below about 160 KJ/mol $CO_2$ (e.g., below about 138.9 KJ/mol $CO_2$). This can provide a major reduction in energy input costs and operating costs for carbon capture methods, systems and/or apparatuses that use the solvent.

Advantageously, some preferred embodiments of the solvent may have an initial absorption rate that is about 37% higher than that of MEA. For example, some preferred embodiments of the solvent may have an initial absorption rate that is greater than about $$0.45 \text{ (e.g., greater than about } 0.48) \frac{10^{-2} * \text{kJ mol CO}_2}{L.soltn * \min}.$$

This can reduce the size and/or cost of carbon capture systems and/or apparatuses that use the solvent.

Advantageously, some preferred embodiments of the solvent may have an initial desorption rate that is about 3.85 times higher than that of MEA. For example, some preferred embodiments of the solvent may have an initial desorption rate that is greater than about $$18.0 \text{ (e.g., greater than about } 20.41) \frac{10^{-2} * \text{kJ mol CO}_2}{L.soltn * \min}.$$

This can reduce the size and/or cost of carbon capture systems and/or apparatuses that use the solvent.

Advantageously, some preferred embodiments of the solvent may have a cyclic capacity that is 85% higher than that of MEA. For example, some preferred embodiments of the solvent may have a cyclic capacity greater than $$1.15 \text{ (e.g., greater than about } 1.20) \frac{\text{mol CO}_2}{L.soltn}.$$

This can reduce the volume of the solvent required in carbon capture processes, and reduce the size and/or cost of carbon capture systems and/or apparatuses that use the solvent.

Advantageously, some preferred embodiments of the solvent may have a lean loading of approximately 0 at 110° C. This can help achieve nearly complete release of captured $CO_2$ at lower relative temperatures, which is expected to further reduce energy requirements systems and/or apparatuses that use the solvent.

According to a preferred embodiment of the present invention, the solvent may have any one or more of the following properties: a heat duty below 160 KJ/mol $CO_2$, an initial absorption rate greater than $$0.40 \frac{10^{-2} * \text{kJ mol CO}_2}{L.soltn * \min},$$

an initial desorption rate greater than $$18.0 \frac{10^{-2} * \text{kJ mol CO}_2}{L.soltn * \min},$$

a cyclic capacity greater than $$1.05 \frac{\text{mol CO}_2}{L.soltn},$$

a lean loading or u at 110° C., a viscosity below 10 mPa·s at 30° C., and an alkalinity in the range of 9.5 to 11.0 pKa at room temperature.

According to a preferred embodiment of the present invention, the solvent may have any one or more of the following properties: a heat duty below 138.9 KJ/mol $CO_2$, an initial absorption rate greater than $$0.48 \frac{10^{-2} * \text{kJ mol CO}_2}{L.soltn * \min},$$

an initial desorption rate greater than $$20.40 \frac{10^{-2} * \text{kJ mol CO}_2}{L.soltn * \min},$$

a cyclic capacity greater than $$1.20 \frac{\text{mol CO}_2}{L.soltn},$$

a lean loading of 0 at 110° C., a viscosity below 10 mPa·s at 30° C., and an alkalinity in the range of 9.5 to 11.0 pKa at room temperature.

Another aspect of the present invention relates to a method of performing carbon capture. The method comprises collecting flue gas from a flue gas emitting source and reacting the collected flue gas with the solvent described herein.

Other aspects of the present invention relate to systems for performing carbon capture. Preferably, such systems comprise components configured to perform methods of performing carbon capture using the solvents described herein. Other aspects of the present invention relate to an apparatus for performing carbon capture. Preferably, such apparatus comprises components configured to perform methods of performing carbon capture using the solvents described herein.

Another aspect of the present invention relates to the use of a solvent according to a preferred embodiment of the present invention, to perform carbon capture by collecting a flue gas comprising carbon dioxide from a flue gas emitting source and exposing the collected flue gas to said solvent for a period of time sufficient to remove at least a portion of said carbon dioxide gas present in said flue gas.

Additional aspects of the present invention will be apparent in view the description which follows.

BRIEF DESCRIPTION OF THE DRAWINGS

Features and advantages of the embodiments of the present invention will become apparent from the following detailed description, taken in combination with the appended drawings in which.

DETAILED DESCRIPTION

Figure 1:
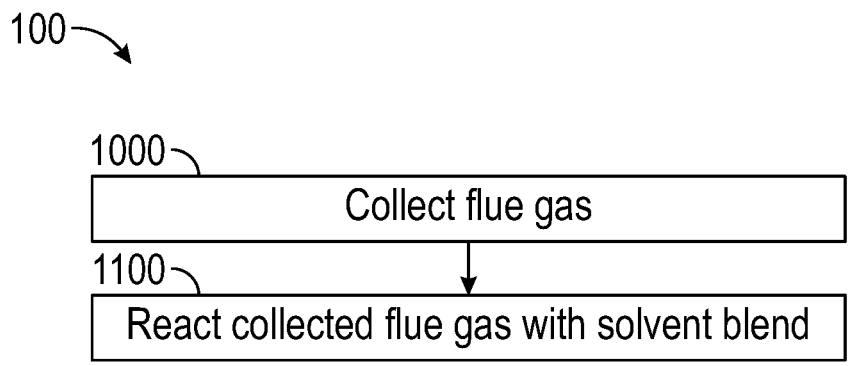
FIG. 1 is a flowchart depicting a method of carbon capture according to a preferred embodiment of the present invention.

The description which follows and the embodiments described therein are provided by way of illustration of an example or examples of particular embodiments of the principles of the present invention. In the following description of the invention, numerous examples are provided and specific details are set forth for the purposes of explanation and not limitation in order to provide a thorough understanding of the invention. The person skilled in the art will readily appreciate that the well-known methods, procedures and/or components will not be described as to focus on the invention in question. Accordingly, in some instances, certain structures and techniques have not been described or shown in detail in order not to obscure the invention.

It was determined that the performance of amines (e.g. their tolerance to amine degradation and the consequent emissions) in carbon capture processes can depend highly on the amine's functional groups and how they are placed in the amine structure. The chemical structural positioning of different functional groups in different amines and their effects on the rates of $CO_2$ absorption and desorption, $CO_2$ cyclic capacity, heat duty, amine degradation, off-gas emissions (specifically $NH_3$), corrosion, and foaming were recorded and assessed. It was noted that the interaction of components in a given solvent can influence the overall performance of the solvent. Careful selection of various components of a given carbon capture solvent based on their possible interactions was undertaken to develop novel solvent systems which outperform known solvents used in carbon capture.

In light of the above knowledge and as described in more detail elsewhere herein, the inventors have formulated and reduced to practice solvent compositions that substantially outperform conventional solvents (e.g. 5M MEA) used in carbon capture applications. Unless context dictates otherwise, such solvent compositions may be referred to herein as solvents. The term solvent, as used herein, may be a compound or a blend or mixture of a plurality of compounds (i.e., a "solvent blend" or a "solvent mixture"). Carbon capture solvents as described herein typically comprise a first compound, which may be referred to herein as "Compound I", and/or a second compound, which may be referred to herein as "Compound II". The person skilled in the art will also understand that solvent is meant to refer to a liquid, more preferably a homogeneous liquid.

According to a preferred embodiment of the present invention, compound I is a tertiary amine, having a chemical formula of $(R_1)(R_2)N(C_nH_{2n}-OH)$, where $R_1$ and $R_2$ are independently a linear or branched alkyl group with a carbon number between 1 to 6, preferably between 2 to 4, and n is an integer between 1 to 6, preferably between 2 to 4. According to a preferred embodiment of the present invention, compound I can be, for example, diethylaminoethanol.

As used herein, the term "diethylaminoethanol" or "DEAE" refers to a tertiary amine whose amino nitrogen is connected to two ethyl groups and one ethyl-amino group. Specifically, the two (2) ethyl substituents have electron donating property that provides extra electron density to the amino nitrogen of the molecule. The richness of electrons on the amino group reaction center can enhance the $CO_2$ and amine reactivity. Thus, additional electrons supplied to the DEAE's amino nitrogen increases its reaction absorption rate with $CO_2$. Advantageously, the absorption rate of DEAE is higher than that of the conventional tertiary amines such as MDEA whose molecule only contains a weaker electron donating methyl substituent.

Advantageously, DEAE also has a fast $CO_2$ desorption rate. The fast desorption rate can also be attributed to the two ethyl substituents on the amine structure. Since, DEAE is a tertiary amine, bicarbonate ($HCO_3^-$) and carbonate ($CO_3^{2-}$) are only formed from the absorption reaction. Due to the negative charges on the two anionic products, they are also attracted to the protonated amine generated also in the solution. Such attraction determines the desorption ability of the amine such that the weaker the electrostatic attraction between the charged species, the better and the faster the desorption rate. In the case of DEAE, the presence of the two (2) ethyl substituents with electron donating property weakens the ionic attraction. Electrons supplied to the protonated amine's nitrogen by the two (2) ethyl substituents repel the $HCO_3^-$ and $CO_3^{2-}$. The repulsion leads to a molecular break-down of the two (2) ionic species which subsequently releases the $CO_2$. In contrast, conventional tertiary amines such as MDEA do not have the same ability to weaken the attraction between its protonated constituent and the two (2) carbonates (i.e., due to a less efficient methyl group unable to provide the same electron density to the nitrogen, thus less effective desorption process).

According to a preferred embodiment of the present invention, compound II contains two primary amino groups, having a chemical formula of $NH_2-(C_mH_{2m})-NH_2$, where m is an integer between 2 to 10, preferably between 4 to 8. According to a preferred embodiment of the present invention, compound II can be, for example, hexamethylenediamine.

As used herein, the term "hexamethylenediamine" or "HMDA" refers to a diamine whose molecule comprises two (2) primary amino groups connected to each other by six (6) carbons. Both primary amino groups in HMDA structure are able to provide the maximum of two (2) active sites for the $CO_2$ absorption reaction to take place. This also implies that one (1) molecule of HMDA can take the maximum two (2) molecules of $CO_2$. In comparison to convention primary amines such as MEA, the $CO_2$ access to number of the reaction reactive site on MEA molecule is limited to one (1), thus absorption reaction occurs only on a one (1) molecule MEA per one (1) molecule $CO_2$ basis. Hence, HMDA helps to increase the $CO_2$ amount absorbed per cycle from that obtained from MEA.

According to a preferred embodiment of the present invention, carbon capture solvents described herein may also comprise one or more additional compounds in addition to Compound I and/or Compound II described above. For example, carbon capture solvents described herein may comprise polyethylenimine.

As used herein, the term "polyethylenimine" or "PEI" refers to a polymeric amine whose structure contains: (a) multi groups of primary, secondary, and tertiary amine encased in a branched polymeric structure; (b) multi groups of primary and tertiary amine encased in a branched polymeric structure; or (c) multi groups of secondary amine in a linear polymeric structure. Branched polyethylenimines with all of primary, secondary, tertiary amino groups are preferred in some embodiments of the present invention. The absorption characteristic of PEI benefits from its primary and secondary amino groups while secondary and tertiary amino groups facilitate its desorption of $CO_2$. According to a preferred embodiment of the present invention, the PEI has up to fifteen (15) active amino groups that have affinity toward the $CO_2$ in the absorption reaction. This implies that $CO_2$ amount captured per amine molecule of PEI can far exceed those of conventional amines like MEA and MDEA whose $CO_2$ capacities are known to limit to 0.5 and 1 respectively. Thus, $CO_2$ capture capacity of PEI can be several-fold more than those of the single amines.

According to a preferred embodiment of the present invention, the carbon capture solvent comprises one or more of: diethylaminoethanol (DEAE), hexamethylenediamine (HMDA), and polyethylenimine (PEI). For example, the carbon capture solvent blend may be an aqueous solution comprising one or more of: diethylaminoethanol (DEAE), hexamethylenediamine (HMDA), and polyethylenimine (PEI).

In some embodiments, the solvent comprises DEAE with a molar concentration in the range of 2.0M to 4.0M (e.g., 2.0M, 2.05M, 2.10M, 2.15M, 2.20M, 2.25M, 2.30M, 2.35M, 2.40M, 2.45M, 2.50M, 2.55M, 2.60M, 2.65M, 2.70M, 2.75M, 2.80M, 2.85M, 2.90M, 2.95M, 3.00M, 3.05M, 3.10M, 3.15M, 3.20M, 3.25M, 3.30M, 3.35M, 3.40M, 3.45M, 3.50M, 3.55M, 3.60M, 3.65M, 3.70M, 3.75M, 3.80M, 3.85M, 3.90M, 3.95M, 4.00M, or any value therebetween).

In some embodiments, the solvent comprises HMDA with a molar concentration in the range of 0.10M to 1.00M (e.g., 0.10M, 0.15M, 0.20M, 0.25M, 0.30M, 0.35M, 0.40M, 0.45M, 0.50M, 0.55M, 0.60M, 0.65M, 0.70M, 0.75M, 0.80M, 0.85M, 0.90M, 0.95M, 1.00M, or any value therebetween).

In some embodiments, the solvent comprises PEI with a molar concentration in the range of 0.005M to 0.50M (e.g., 0.005M, 0.01M, 0.015M, 0.02M, 0.025M, 0.03M, 0.035M, 0.04M, 0.045M, 0.05M, 0.10M, 0.15M, 0.20M, 0.25M, 0.30M, 0.35M, 0.40M, 0.45M, 0.50M, or any value therebetween).

In some embodiments, the solvent comprises PEI having a molecular weight of between about 750 Da to about 850 Da (e.g., 800 Da). In some embodiments, the number of repeating units of the PEI in the solvent is about 1.5. In some cases, if the PEI's molar mass it too high, it may cause the solvent to be too viscous and suboptimal for carbon capture applications in some cases.

In some embodiments, the solvent has a total molar concentration of 5.5M or less (i.e., beyond which precipitation issues and phase separation issues may occur). In some embodiments, the solvent has a total molar concentration of about 4.0M (e.g., within ±0.01M). In some embodiments, the solvent comprises 3.6M DEAE, 0.4M HMDA, and 0.01M PEI (e.g., within ±0.001M for each of DEAE, HMDA, and PEI).

In some embodiments, the solvent has a lean loading of ~0 at 110° C. (i.e., implying that the solvent can be used at relatively lower temperatures while achieving lean loadings close to 0).

In some embodiments, the solvent has a viscosity below 10 mPa·s at 30° C. (e.g., 9.5 mPa·s, 9.0 mPa·s, 8.5 mPa·s, 8.0 mPa·s, 7.5 mPa·s, 7.0 mPa·s, 6.5 mPa·s, 6.0 mPa·s, 5.5 mPa·s, 5.0 mPa·s, 4.5 mPa·s, 4.0 mPa·s, 3.5 mPa·s, 3.0 mPa·s, 2.5 mPa·s, 2.0 mPa·s, 1.5 mPa·s, 1.0 mPa·s, or any value therebetween at 30° C.).

In some embodiments, the solvent has an alkalinity in the range of 9.5 to 11.0 pKa at room temperature (e.g., 9.55 pKa, 9.60 pKa, 9.65 pKa, 9.70 pKa, 9.75 pKa, 9.80 pKa, 9.85 pKa, 9.90 pKa, 9.95 pKa, 10.00 pKa, 10.05 pKa, 10.10 pKa, 10.15 pKa, 10.20 pKa, 10.25 pKa, 10.30 pKa, 10.35 pKa, 10.40 pKa, 10.45 pKa, 10.50 pKa, 10.55 pKa, 10.60 pKa, 10.65 pKa, 10.70 pKa, 10.75 pKa, 10.80 pKa, 10.85 pKa, 10.90 pKa, 10.95 pKa, or any value therebetween at room temperature).

It was noted that functional groups that increase the electron density around the nitrogen reactive site can increase the $CO_2$ absorption rate. In some instances, amines with multi amine groups were also recognized to increase $CO_2$ absorption rate due to increased number of available nitrogen reactive sites. In addition, it was noted that the high number of amino groups increased the $CO_2$ absorption capacity of the amines. Based on this knowledge, it was assessed that including a diamine such as HMDA in a solvent blend can provide the benefits of fast $CO_2$ absorption kinetics.

It was surprisingly and unexpectedly discovered that PEI, a multi amine polymer, when included in a solvent blend, substantially improved solvent qualities for use in carbon capture and sequestration. According to a preferred embodiment of the present invention, a branched PEI with about fifteen (15) amine groups increased the $CO_2$ absorption kinetics and the $CO_2$ carrying capacity of the solvent blend. PEI is a very viscous amine and can be preferably used at concentrations at and below about 0.3M.

According to a preferred embodiment of the present invention and in order to tackle the desorption aspect of the solvent blend, a component with a high performing desorption ability was incorporated into the solvent. It was recognized that tertiary amines, which are typically known to have high desorption performance, have low absorption performance due to the absence of a hydrogen atom on the central nitrogen atom. In view of this, a tertiary amine whose structure can allow it to absorb $CO_2$ faster than a traditional tertiary amine would was incorporated into the solvent. It was determined that the presence of the two ethyl groups substituted on the central nitrogen atom increases its electron density, and hence its reactivity towards $CO_2$. To achieve this, DEAE, a compound having a very high stripping ability and a suitable structure, was incorporated as part of the solvent blend. Owing in part to its relatively less viscous nature, DEAE can be used in relatively higher concentrations to provide a synergistic benefit to the overall mixture based on its unique characteristics.

According to a preferred embodiment of the present invention, a solvent described herein provides improved performance over conventional solvents used in carbon capture processes. For example, some solvent blends described herein provide an initial $CO_2$ absorption rate that is up to about 37% higher than that of convention MEA solvents (e.g., Solvent 23 described below had a higher initial $CO_2$ absorption rate than 5M MEA). As another example, some solvent blends described herein provide an initial $CO_2$ desorption rate that is up to about 3.85 times higher than that of conventional MEA solvents. As another example, some solvent blends described herein provide cyclic capacity that is up to about 85% higher than that of convention MEA solvents. As another example, some solvent blends described herein have much lower $NH_3$ emission rates than those of convention MEA solvents.

Other additional non-limiting advantages provided by preferred solvents described herein are described in more detail below with reference to certain specific properties of other known compositions:

In comparison with HMDA-PZ solvents, where HMDA helps to solve the solubility issue encountered in that mixture thereby widening the molality for PZ to absorb more $CO_2$, solvents described herein use HMDA as an accelerant, thereby increasing the absorption rate;

In comparison with other solvent formulas where DEAE was used as an accelerant, DEAE has been used as the main component of solvent blends described herein to increase the $CO_2$ uptake capacity as well as enhancing the desorption performance to achieve a lean loading close to zero at lower temperatures;

In comparison with other solvent formulas where the role played by DEAE is not clearly defined, the role of DEAE in solvents described herein plays the role of increasing the $CO_2$ uptake capacity, acting as viscosity depressant, and providing excellent desorption performance to achieve a lean loading close to zero at lower temperatures;

In comparison with other solvent formulas that require the absorbing process to be provided at 1 bar or higher and/or the desorbing process to be provided at 0.01 bar and higher (i.e., other solvent formulas can require a pressurized $CO_2$ capture system), solvents described herein can be used in both atmospheric and pressurized $CO_2$ absorption systems;

In comparison with other solvent formulas that used DEAE as an accelerant to increase the rate of $CO_2$ uptake (e.g., solvent composition comprising DEAE, PZ or its derivatives, and alkali salt), solvents described herein may comprise HMDA and/or PEI that provide a synergistic benefit to the overall mixture based on their unique characteristics (i.e., the contribution of DEAE to convention solvent mixtures, as well as its interactions with the other components, PZ and/or the alkali salt, will be different from that in solvent mixtures described herein which contains two entirely different solvents from those traditionally used).

While HMDA has been proposed for use in applications related to carbon capture, existing technologies are limited to using HMDA in association with solid sorbents, using HMDA in a biphasic scrubbing solution, and using HMDA as a cluster stabilizer.

While PEI has been proposed for use in applications related to carbon capture, existing technologies are limited to using PEI in amine solid sorbent for $CO_2$ adsorption (e.g., using PEI as part of the carbon capture layer where the amine is functionalized on to solid materials such as graphene oxide or non-porous carbon).

Another aspect of the invention provides a method of carbon capture using solvents described herein. FIG. 1 is a flowchart depicting a method 100 of performing carbon capture according to an preferred embodiment. Method 100 begins at step 1000, where flue gas is collected from one or more $CO_2$ sources (e.g., an industrial facility, a plant, a machine, an engine, etc.). The flue gas may be collected using any suitable method in step 1000. After collecting the flue gas in step 1000, method 100 proceeds to step 1100. At step 1100, a solvent is reacted with the collected flue gas to separate $CO_2$ from the rest of the flue gas. The solvent is understood to be any one of the preferred solvents according to the present invention. In some embodiments, step 1100 comprises reacting the collected flue gas with a solvent blend comprising one or more of: diethylaminoethanol (DEAE), hexamethylenediamine (HMDA), and polyethylenimine (PEI). In some embodiments, step 1100 comprises reacting the collected flue gas with a solvent blend comprising diethylaminoethanol (DEAE), hexamethylenediamine (HMDA), and polyethylenimine (PEI). In some embodiments, step 1100 comprises reacting the collected flue gas with an aqueous solution comprising diethylaminoethanol (DEAE), hexamethylenediamine (HMDA), and polyethylenimine (PEI). Step 1100 may comprise reacting the collected flue gas with a solvent comprising diethylaminoethanol (DEAE), hexamethylenediamine (HMDA) and/or polyethylenimine (PEI), where each compound may have any suitable concentration (e.g., any concentration described herein).

After reacting the collected flue gas with the solvent in step 1100, method 100 may, in some embodiments, proceed to one or more of the following optional steps (not shown): a step of regenerating the solvent blend by stripping away the captured $CO_2$ from the rich solvent, a step of releasing the clean flue gas into the atmosphere, a step of injecting the stripped $CO_2$ into a geological formation, etc.

Other aspects of the invention include systems and/or apparatuses that may be configured to implement carbon capture methods of the kind described above.

In addition to the exemplary aspects described above, the present invention is further described in the following Examples, which are set forth to aid in the understanding of the invention, and should not be construed to limit in any way the scope of the invention as defined in the claims which follow thereafter.

EXAMPLES

The viability of different solvents for use in carbon capture processes was assessed. In the experiments, various aqueous amine solutions were prepared to a desired condition by mixing predetermined mass of the amine/amines with deionized water. The amine/amines comprised one or more of the following compounds: 2-diethylaminoethanol (DEAE), hexamethylenediamine (HMDA), polyethylenimine (PEI, branch), 2-dimethylaminoethanol (DMAE), and monoethanolamine (MEA).

In the experiments, 1M hydrochloric acid (HCl, Fisher Chemical) was used for titration with methyl orange as an indicator to confirm the concentration of the amine solution and the solution's $CO_2$ loading. In the experiments, Sulfuric acid ($H_2SO_4$, >67%, Fisher Chemical) was used to prepare the impinger solution for collection of $NH_3$ in off-gas released from the amine degradation reaction. Research grade of 100% CO2, 100% $O_2$, air, and 100% $N_2$ were all industrial grade and supplied from Linde (Regina, Saskatchewan, Canada). The desired feed gas concentration used in the experiments was obtained by the inventors by mixing predetermined volumetric flow rates of individual gases needed for such experiment which were adjusted and controlled by mass flow meters (Cole-Parmer, Canada). Final concentrations of all constituents in the mixed gas stream were confirmed by the inventors using infrared based multi-gas analyser (Nova Analytical Systems, Canada).

The compositions of the solvents used in the experiments are shown in Table 1 below:

to reach the temperature of $40\pm°$ C. The gas (4% $CO_2$ and 96% $N_2$) was then bubbled into the solution through the gas dispersion tube at a constant flow rate of 300 ml/min ($\pm 2$ accuracy). Samples were then taken at regular intervals of 10 min for the first 1 hour, and then 30 min interval until at the end of 9 hours. The final loading recorded at the 9th hour was taken as the rich loading. Samples were analyzed using the Chittick apparatus to obtain the $CO_2$ loading at each time period, and a plot of $CO_2$ loading versus time was generated based on the data.

Figure 3A:
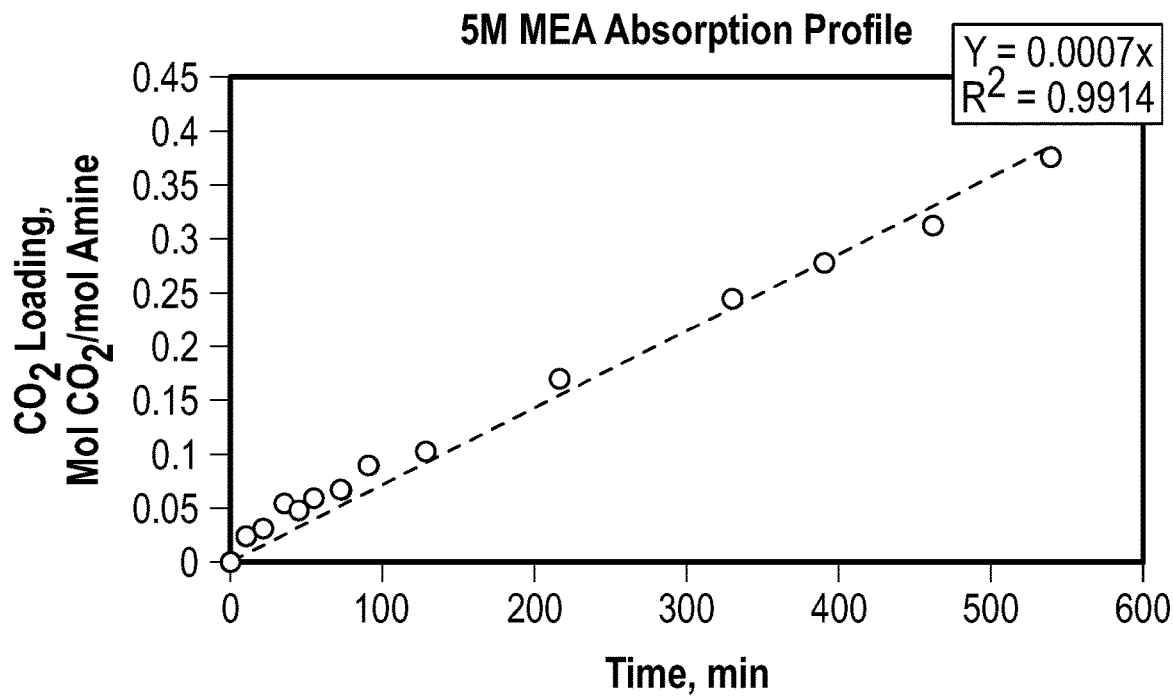
FIG. 3A illustrates the absorption profile of a 5M MEA solvent produced by an experiment performed by the inventors using the FIG. 2 experimental set-up.

The slope of the linear section of the absorption profile was used to establish the initial absorption rate (mol $CO_2$/L·solution), which is essentially the slope multiplied by the total amine concentration. The initial absorption rate is calculated by multiplying the slope by the amine concentration. For example, the Absorption Profile of 5M MEA is shown in FIG. 3A and the initial absorption rate of such a solution is calculated as shown in Equation (1) below:

$$\text{Initial Absorption Rate} = 0.0007 \frac{\text{mol CO2}}{\text{mol amine.min}} * 5 \frac{\text{mol amine}}{\text{liter of } soltn} = \quad (1)$$

$$0.35 * 10^{-2} \frac{\text{mol CO2}}{\text{liter of } soltn * \text{min}}$$

TABLE 1

Shows the composition of the solvents used by the inventors to perform experiments

| | DEAE | HMDAe | PEI | DMAE | 3AIP | MEA | Total |
|---|---|---|---|---|---|---|---|
| Baseline MEA | | | | | | 5.00M | 5.00M |
| Solvent 1 | | 1.85M | 0.15M | 2.00M | | | 4.00M |
| Solvent 2 | | | 0.30M | 3.00M | | | 3.30M |
| Solvent 3 | | 1.00M | 0.30M | 3.70M | | | 5.00M |
| Solvent 4 | | | 0.46M | 4.54M | | | 5.00M |
| Solvent 5 | | | 0.37M | 3.63M | | | 4.00M |
| Solvent 6 | | | 0.30M | 3.00M | 1.70M | | 5.00M |
| Solvent 7 | | 0.40M | 0.10M | 4.00M | | | 4.50M |
| Solvent 8 | | 1.85M | 0.15M | 1.00M | | | 3.00M |
| Solvent 9 | | 1.85M | 0.15M | | | | 2.00M |
| Solvent 10 | | | 0.37M | 3.63M | | | 4.00M |
| Solvent 11 | 1.21M | | 0.37M | 2.42M | | | 4.00M |
| Solvent 12 | | | 0.50M | 4.00M | | | 4.5M |
| Solvent 13 | 3.00M | | | | | | 3.00M |
| Solvent 14 | 2.73M | 0.27M | | | | | 3.00M |
| Solvent 15 | 3.85M | | 0.15M | | | | 4.00M |
| Solvent 16 | 3.85M | 0.15M | | | | | 4.00M |
| Solvent 17 | 4.5M | 0.5M | 0.001M | | | | 5.001M |
| Solvent 18 | 4.5M | 0.5M | 0.005M | | | | 5.005M |
| Solvent 19 | 4.5M | 0.15M | 0.01M | | | | 5.01M |
| Solvent 20 | 4.5M | 0.5M | 0.015M | | | | 5.015M |
| Solvent 21 | 3.85M | 0.15M | 0.01M | | | | 4.01M |
| Solvent 22 | 3.85M | 0.15M | 0.015M | | | | 4.015M |
| Solvent 23 | 3.6M | 0.4M | 0.01M | | | | 4.01M |
| Solvent 24 | 3.6M | 0.4M | 0.015M | | | | 4.015M |
| Solvent 25 | 3.6M | 0.4M | | | | | 4.00M |

Example 1—Absorption Experiment

Figure 2:
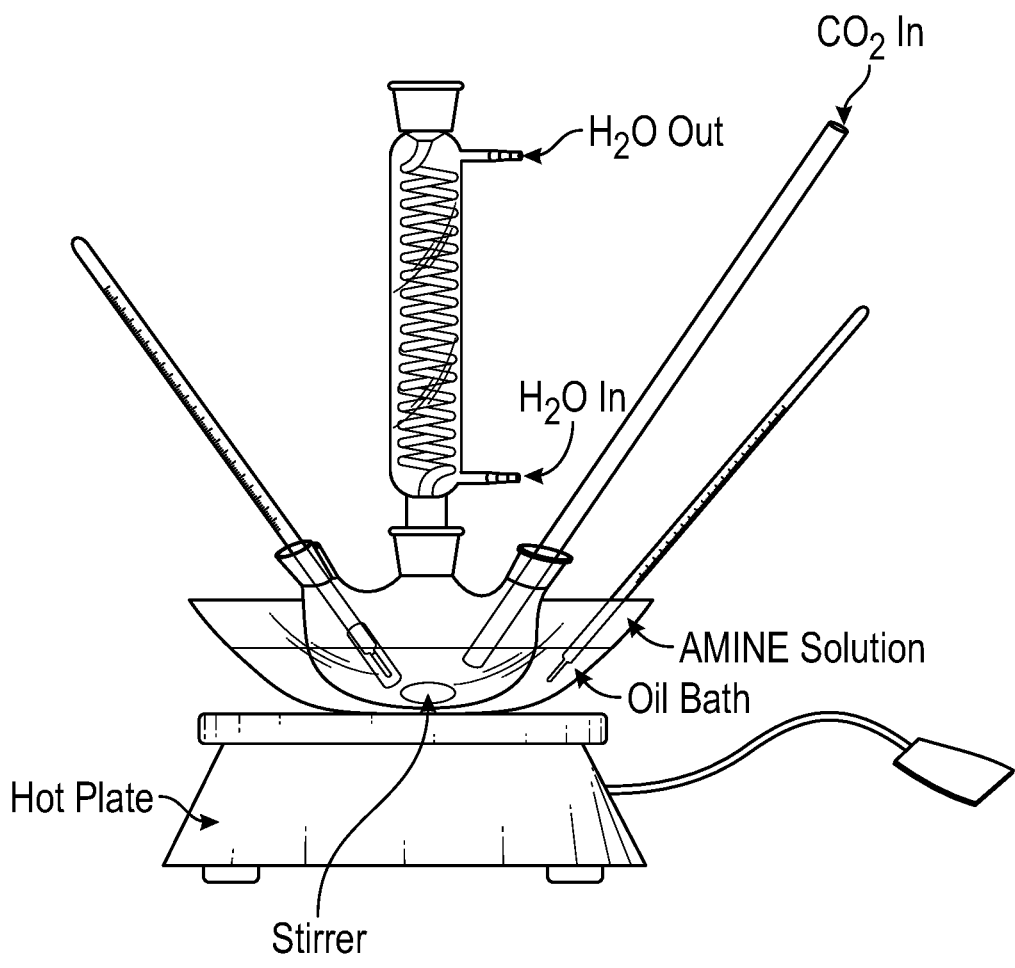
FIG. 2 illustrates an experimental set-up used by the inventors to measure the absorption and desorption characteristics of various exemplary solvents of the present invention.

The $CO_2$ absorption rate of the solvents was evaluated and listed in Table 1. The $CO_2$ absorption rate was evaluated by performing experiments using the apparatus shown in FIG. 2. The apparatus has a three-necked round bottomed flask with a condenser installed at the middle neck, a thermometer at one neck for amine solution temperature measurement, and a gas dispersion tube on the other neck for feeding the gas.

At the beginning of each absorption experiment, a prepared amine solution of 150 ml contained in the flask was fully immersed in the oil bath in order for the amine solution The $CO_2$ absorption rate and rich loading of the various different solvents is listed in Table 2 below.

Example 2—Desorption Experiment

The $CO_2$ desorption rate of the solvents was also evaluated and listed in Table 1. In the desorption experiment, a known volume (76 ml) was measured from the rich amine solution obtained from the absorption experiment. The same setup used for the absorption experiment was used for this experiment. However, in this experiment the gas dispersion tube shown in FIG. 1 was removed and the neck was sealed off. At the beginning of the desorption experiment, the flask was totally immersed in the preheated oil bath and allowed to reach the desorption temperature of 110±2° C. The heating time was approximately 5 min. A sample was taken from the flask at ~4, 5, 7, 9, 12 and 20 min. After that, a sample was taken at intervals of 10 min until equilibrium was reached at 110° C. to obtain the lean loading.

Figure 3B:
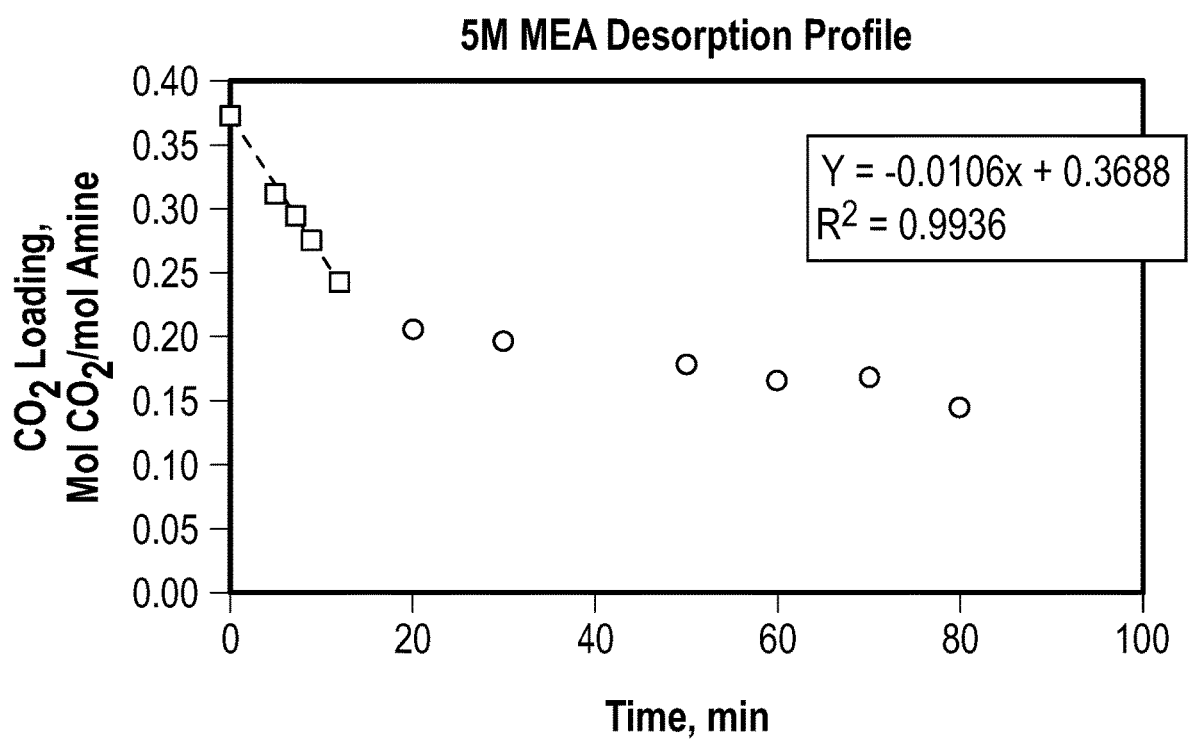
FIG. 3B illustrates the desorption profile of a 5M MEA solvent produced by an experiment performed by the inventors using the FIG. 2 experimental set-up.
Figure 3C:
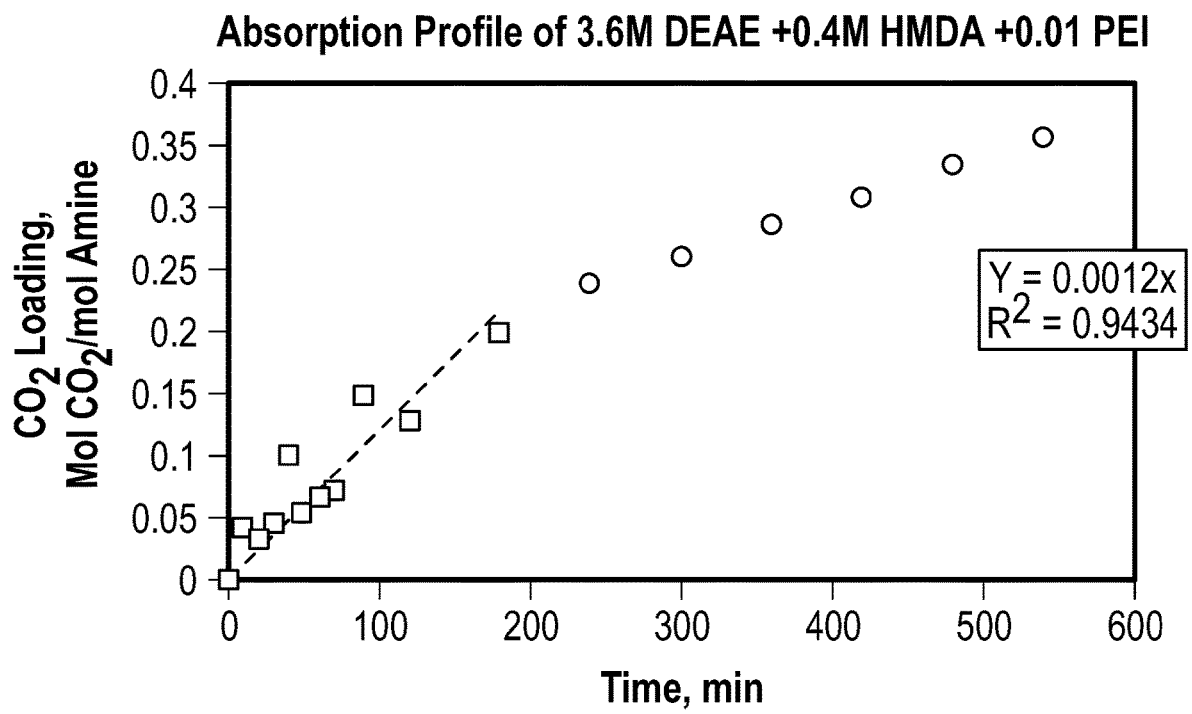
FIG. 3C illustrates the absorption profile of a 3.6M DEAE+0.4M HMDA+0.01M PEI solvent produced by an experiment performed by the inventors using the FIG. 2 experimental set-up.
Figure 3D:
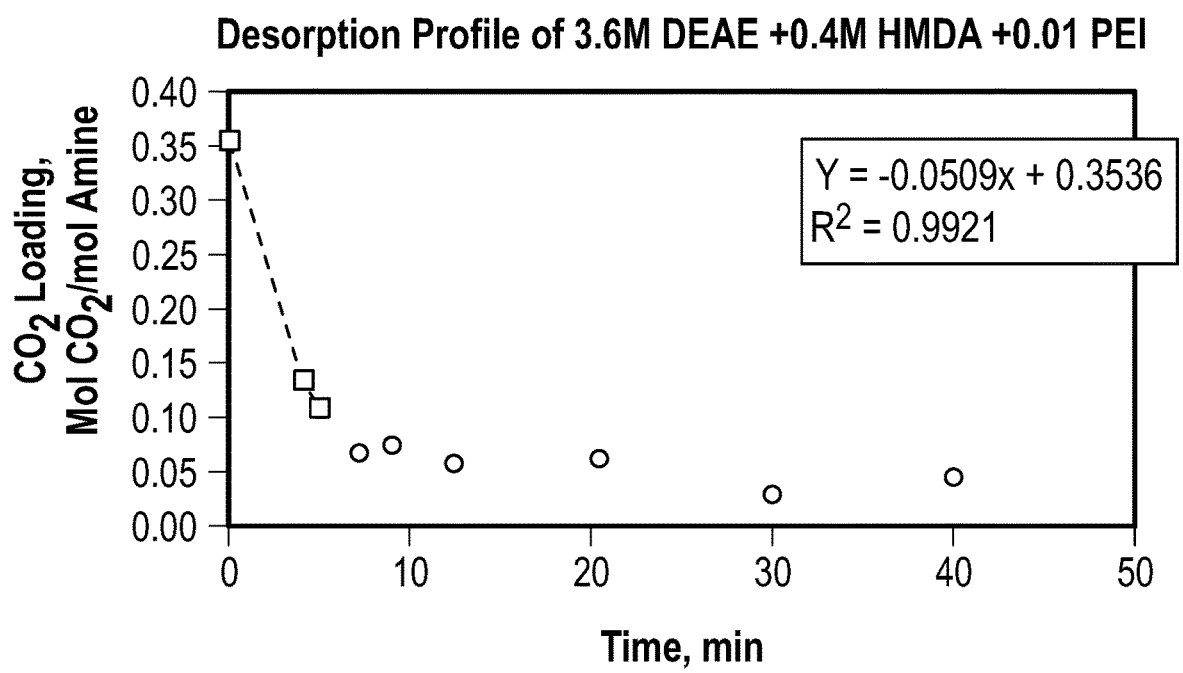
FIG. 3D illustrates the desorption profile of a 3.6M DEAE+0.4M HMDA+0.01M PEI solvent produced by an experiment performed by the inventors using the FIG. 2 experimental set-up.

The initial desorption rate was calculated by determining the slope of the linear section of the desorption as most of the removable $CO_2$ had been removed within that section. For example, the Desorption Profile of 5M MEA is shown in FIG. 3B and the initial desorption rate was calculated by multiplying the slope by the amine concentration shown in Equation (2) below:

$$\text{Initial Desorption Rate} = -0.0106 \frac{\text{mol CO2}}{\text{mol amine.min}} * 5 \frac{\text{mol amine}}{\text{liter of } soltn} = \quad (2)$$

$$5.3 * 10^{-2} \frac{\text{mol CO2}}{\text{liter of } soltn * \text{min}}$$

The $CO_2$ desorption rate of the various different solvents is listed in Table 2 below.

Example 3—Heat Duty Determination

For each of the various solvents listed in Table 1, the heat duty of the solvent based on the heat rate and the $CO_2$ desorption rate was determined. The heat duty was calculated by determining the ratio of the steady state heat transfer to the amount of $CO_2$ removed during desorption over a 5 min period (i.e., the linear portion of the desorption kinetics profile). Using Fourier's equation of molecular heat transport to calculate the heat supplied from the oil bath as shown in Equation (3):

$$\text{Heat rate, } q = \frac{kAdT}{dX} \quad (3)$$

where q is the rate of heat transfer at steady state in J/s, k is the thermal conductivity of the Pyrex glass used for the flask material in W/m K, A is the cross-sectional area normal to the direction of heat flow in $m^2$, and dT/dx is the temperature gradient ($K^{-1}$ $m^{-1}$). The temperature difference, dT was taken as the difference between the oil temperature and the inner wall temperature of the flask, while dx was the glass wall thickness. The heat duty was then calculated using Equation (4):

$$\text{Heat Duty} \cdot \frac{\text{heat rate, } q\left(\frac{J}{s}\right)}{CO_2 \text{ removed } \frac{\text{mol}}{s}} \quad (4)$$

For example, the Heat Duty for baseline 5M MEA is calculated as follows:

$$\text{Heat Duty}_{MEA} =$$

$$\frac{35.91 \text{ J/s}}{5.3 * 10^{-2} \frac{\text{mol CO2}}{L.\text{min}} * 76 * 10^{-3} L * \frac{1 \text{ min}}{60 \text{ s}}} = 534.91 \text{ kJ/mol CO}_2$$

The heat duty of the various different solvents is listed in Table 2 below.

Example 4—Cyclic Capacity Determination

For each of the solvents listed in Table 1, the cyclic capacity of the solvent based on the rich loading, the lean loading, and the molar concentration of the amine was determined. The cyclic capacity refers to how much $CO_2$ has been removed in a cycle. The cyclic capacity is calculated using Equation (5):

$$\text{Cyclic Capacity } (CC)[\text{molCO}_2/L.soltn] = \quad (5)$$

$$\frac{\text{rich loading} - \text{lean loading mol CO2}}{\text{mol amine}} \times [\text{Amine Concentration}]$$

For example, the Cyclic Capacity for 5M MEA is calculated as follows:

$$CC = \frac{0.37 - 0.24 \text{ mol CO2}}{\text{mol amine}} \times \frac{5 \text{ mol amine}}{Lsoltn} = \frac{0.65 \text{ mol CO2}}{Lsoltn}$$

The cyclic capacity of the various different solvent blends is listed in Table 2 below.

TABLE 2

Shows the performance indicators of the solvents used by the inventors to perform experiments described herein

| Solvent System | Absorption rate (×10² mol CO₂/Lsoltn. min) | Rich loading (mol CO₂/ mol amine) | Desorption rate (×10² mol CO₂/Lsoltn. min) | Lean loading (mol CO₂/ mol amine) | Cyclic Capacity (mol CO₂/ mol amine) | Hea Duty (kj/mol CO₂) |
|---|---|---|---|---|---|---|
| Baseline MEA | 0.35 | 0.37 | 5.30 | 0.24 | 0.65 | 534.91 |
| Solvent 1 | 0.32 | 0.44 | 6.04 | 0.36 | 0.32 | 469.37 |
| Solvent 3 | 0.35 | 0.36 | 5.75 | 0.25 | 0.55 | 493.04 |
| Solvent 4 | 0.35 | 0.39 | 10.50 | 0.24 | 0.75 | 270.00 |
| Solvent 10 | 0.48 | 0.50 | 11.12 | 0.29 | 0.84 | 254.95 |
| Solvent 11 | 0.36 | 0.46 | 7.76 | 0.26 | 0.80 | 365.34 |
| Solvent 12 | 0.41 | 0.43 | 6.30 | 0.30 | 0.59 | 450.00 |
| Solvent 14 | 0.33 | 0.58 | 8.94 | 0.36 | 0.66 | 317.11 |
| Solvent 15 | 0.44 | 0.34 | 8.56 | 0.20 | 0.56 | 331.19 |
| Solvent 2 | 0.30 | 0.43 | 4.42 | 0.27 | 0.53 | 641.11 |
| Solvent 5 | 0.32 | 0.42 | 6.48 | 0.25 | 0.68 | 437.50 |

TABLE 2-continued

Shows the performance indicators of the solvents used by the inventors to perform experiments described herein

| Solvent System | Absorption rate ($\times 10^2$ mol $CO_2$/Lsoltn. min) | Rich loading (mol $CO_2$/ mol amine) | Desorption rate ($\times 10^2$ mol $CO_2$/Lsoltn. min) | Lean loading (mol $CO_2$/ mol amine) | Cyclic Capacity (mol $CO_2$/ mol amine) | Heat Duty (kj/mol $CO_2$) |
|---|---|---|---|---|---|---|
| Solvent 6  | 0.35 | 0.34 | 4.95  | 0.27 | 0.40 | 572.73  |
| Solvent 7  | 0.32 | 0.40 | 5.00  | 0.27 | 0.59 | 567.57  |
| Solvent 8  | 0.36 | 0.59 | 1.74  | 0.54 | 0.15 | 1629.31 |
| Solvent 9  | 0.32 | 0.85 | 2.82  | 0.69 | 0.32 | 1005.32 |
| Solvent 13 | 0.27 | 0.40 | 12.60 | 0.07 | 0.99 | 225.00  |
| Solvent 20 | 0.40 | 0.25 | 15.80 | 0.05 | 1.00 | 179.46  |
| Solvent 21 | 0.36 | 0.28 | 17.20 | 0.04 | 0.96 | 164.80  |
| Solvent 16 | 0.48 | 0.30 | 19.40 | 0.03 | 1.08 | 146.13  |
| Solvent 17 | 0.40 | 0.26 | 19.95 | 0.03 | 1.15 | 142.08  |
| Solvent 18 | 0.40 | 0.26 | 18.52 | 0.03 | 1.15 | 153.08  |
| Solvent 19 | 0.40 | 0.27 | 18.89 | 0.03 | 1.20 | 150.08  |
| Solvent 22 | 0.40 | 0.32 | 19.07 | 0.05 | 1.08 | 148.65  |
| Solvent 23 | 0.48 | 0.36 | 20.41 | 0.06 | 1.20 | 138.90  |
| Solvent 24 | 0.48 | 0.36 | 19.31 | 0.06 | 1.20 | 146.80  |
| Solvent 25 | 0.44 | 0.35 | 20.00 | 0.04 | 1.20 | 141.75  |

The primary performance indicators used in these experiments are initial absorption rate, cyclic capacity, initial desorption rate and heat duty. In the course of the testing, two other factors were added—the precipitation and phase separation of amine solution after being loaded with $CO_2$. These two additional factors are very important as each may cause operational issues such as pipe clogging, equipment fouling and increased pumping power requirement during the $CO_2$ capture process.

From the experiments, it was observed that Solvents 1, 3 and 4 had a higher absorption performance (absorption rate and rich loading) as well as a higher desorption rate and lower heat duty than the baseline MEA. Overall, these solvents have better performance than the baseline MEA. However, after loading with $CO_2$ and being left standing for a day, Solvents 1, 3 and 4 precipitated.

It was also observed that Solvents 10, 11, 12, 14 and 15 outperformed the baseline MEA in all aspects. As shown in Table 2, these solvents had higher absorption rates, higher rich loading, higher desorption rates, higher cyclic capacities and lower heat duties when compared with MEA. Although these solvents had good performance, phase separation of the rich-loaded solutions after the end of the absorption experiment was observed.

For Solvents 2, 5, 6, 7 and 8, the absorption rates for solvents in this category were observed by the inventors to be lower or similar to that for MEA. With the exception of Solvent 6, the rich loadings for these solvents were similar to or higher than that of MEA. The desorption rates, cyclic capacities and heat duties for these solvents were all lower than MEA, except Solvent 5, which had a higher desorption rate and cyclic capacity as well as a lower heat duty than that of MEA (e.g., see Table 2). Solvents in this category contained DMAE, whose boiling point is 133° C. Considering the desorption temperature used for this experiment as well as the typical operational temperature range of desorption (110° C.-120° C.), it was hypothesized that using DMAE may lead to high amine losses due to its boiling point.

Solvent 9 was observed to have a relatively lower performance than MEA. Solvent 13, on the other hand, was observed to have better performance than the baseline MEA as shown in Table 2. Solvents in this group had a total concentration ranging from 2M-3M. Using low amine concentration would require higher solvent circulation rates.

Aside from having lower rich loadings than MEA, Solvents 20 and 21 were observed to have significantly higher desorption rates, cyclic capacities and significantly lower heat duties than MEA (e.g., see Table 2). A high rich loading becomes useful when the amine is able to easily desorb a significant amount of $CO_2$. It is worth mentioning that even though solvents in this group had lower rich loading than MEA, due to their high stripping ability, the amount of $CO_2$ that is removed is higher than that for MEA, whose rich loading is high, but whose $CO_2$ desorption rate/stripping ability is lower.

Solvent 16 was observed to have a rich loading lower than MEA. However, in terms of the other performance indicators, this solvent outperformed MEA. In terms of the absorption rate, Solvent 16 had an absorption rate 37% higher than MEA. For cyclic capacity, Solvent 16 was 66% higher than MEA. In terms of the desorption rate, Solvent 16 was ~3.7 times that of MEA whereas the heat duty for this solvent was ~3.7 times lower than MEA (e.g., see Table 2). The lean loading obtained for this solvent is very close to zero unlike that for MEA.

Solvent 17 was adjusted to increase the contribution of HMDA in the formula, in order to enhance the absorption rate. PEI was added to increase the absorption capacity as well as the absorption rate. The results show that the absorption rate for this solvent was 14% higher than MEA. However, its rich loading was lower than MEA. In terms of desorption, its desorption rate was ~3.8 times that of MEA. In terms of heat duty, its heat duty was ~3.8 times lower than that of MEA. With a lean loading approximately zero, its cyclic capacity was 76% higher than that of MEA (e.g., see Table 2). The contributions of HMDA and PEI were not clearly noticeable, mainly due to the fact that the concentration was higher, thereby increasing the mass transfer limitation as well. However, increasing the concentration of DEAE in the formula enhanced the desorption rate as well as the cyclic capacity.

Solvent 18 was adjusted to increase the concentration of PEI while maintaining a total concentration of 5M and a DEAE/HMDA ratio of 9. It was noted that this adjustment did not help the absorption but rather decreased the desorption performance when compared with Solvent 17. The results for this solvent still show higher performance than the baseline solvent MEA. In terms of the absorption rate, solvent 18 is 14% higher than MEA, desorption rate ~3.5 times that of MEA and its heat duty is ~3.5 times lower than MEA as well as its cyclic capacity 76% higher than that of MEA (e.g., see Table 2).

Solvents 19 was adjusted to further increase the concentration of PEI while maintaining a total concentration of 5M and a DEAE/HMDA ratio of 9. It was noted that this adjustment did not help the absorption but rather decreased the desorption performance when compared with Solvent 17. The results for this solvent still show higher performance than the baseline solvent MEA. The cyclic capacity on the other hand increased a bit when compared with solvent 18. In terms of the absorption rate, solvent 19 is 14% higher than MEA, desorption rate ~3.6 times that of MEA and its heat duty is ~3.6 times lower than MEA as well as its cyclic capacity 85% higher than that of MEA (e.g., see Table 2).

Solvent 22 comprised 3.85M DEAE, 0.15M HMDA and 0.015M PEI. There was no significant improvement. The results show that solvent 22 had an absorption rate 14% higher than MEA, desorption rate ~3.6 times MEA, heat duty ~3.6 times lower than MEA, cyclic capacity 66% higher than MEA (e.g., see Table 2).

Solvent 23 comprised 3.6M DEAE, 0.4M HMDA and 0.01M PEI. The DEAE/HMDA ratio established in this solvent is similar to that of the ratio in Solvents 17, 18 and 19. The concentration was reduced to 4M in order to reduce mass transfer limitations, and to be able to see the synergistic benefit of the constituents in the blend. The results show that Solvent 23 had the highest performance in all aspects relative to all other solvents as well as the baseline MEA. For the initial absorption rate, Solvent 23 was 37% higher than MEA; for initial desorption rate it was ~3.85 times that of MEA; for cyclic capacity it was 85% higher than MEA and the heat duty was ~3.85 times lower than MEA (e.g., see Table 2).

Solvent 24 comprised 3.6M DEAE, 0.4M HMDA and 0.015M PEI. The concentration of PEI in the blend was increased from 0.01M, as compared to Solvent 23, to 0.015M. The results show that increasing the concentration of PEI did not improve the performance. For the initial absorption rate, Solvent 24 was 37% higher than MEA; for initial desorption rate it was ~3.64 times that of MEA; for cyclic capacity it was 85% higher than MEA and the heat duty was ~3.64 times lower than MEA (e.g., see Table 2).

Solvent 25 comprised 3.6M DEAE and 0.4M HMDA. For the initial absorption rate, Solvent 25 was 26% higher than MEA; for initial desorption rate it was ~3.77 times that of MEA; for cyclic capacity it was 85% higher than MEA and the heat duty was ~3.77 times lower than MEA (e.g., see Table 2).

A method of measuring the performance of the various solvents was developed. The method involved combining the various performance criteria into an absorption parameter and a desorption parameter that can account for the absorption performance as well as the desorption performance. The absorption parameter was defined as the absorption rate ($10^{-2}$ mol $CO_2$/L·soltn). The desorption parameter was defined as a combination of the desorption rate, the cyclic capacity and the heat duty as set out in Equation (6):

$$\text{Desorption Parameter} = \frac{\text{desorption rate} \times \text{cyclic capacity}}{\text{heat duty}}, \quad (6)$$

$$CO_2^3/(L^2 * \min * kJ)$$

Figure 4:
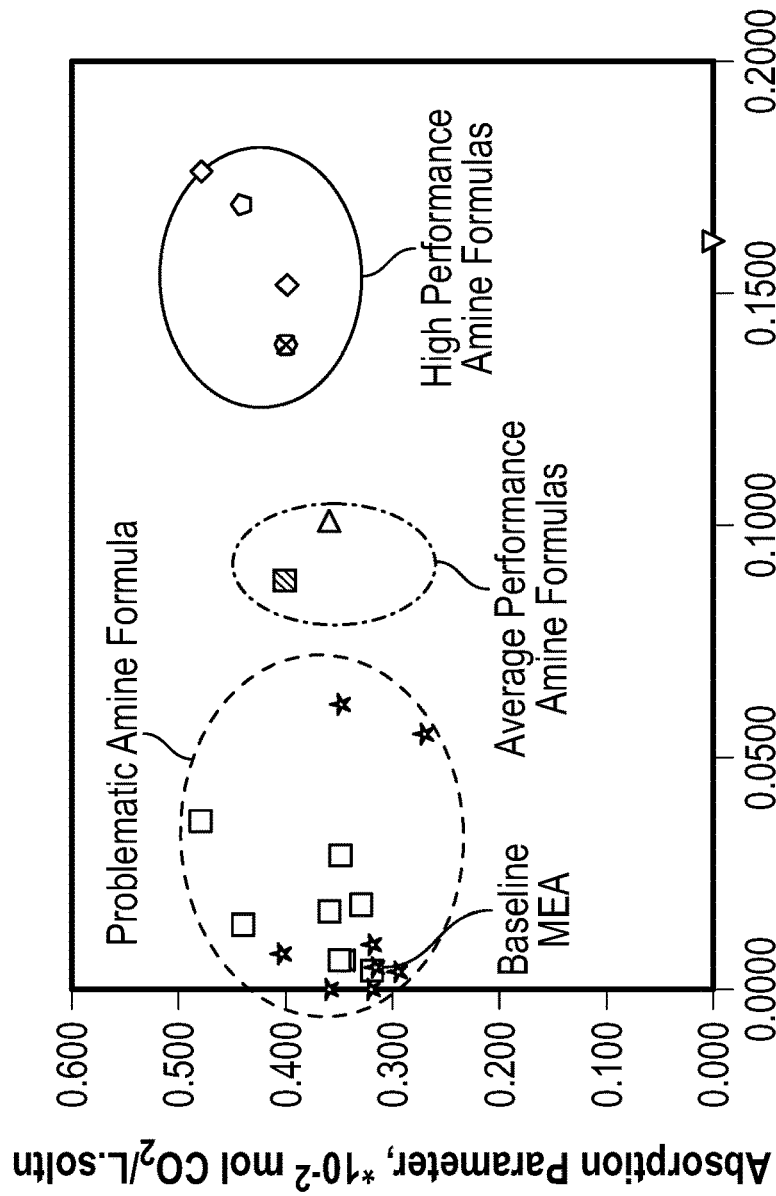
FIG. 4 is a plot of the absorption performance and the desorption performance of various exemplary solvents of the present invention compared to a baseline MEA solvent.

FIG. 4 shows absorption performance plotted against desorption performance (i.e., based on the Absorption Parameter and the Desorption Parameter) for the solvents listed in Table 1. Solvents at the top right corner are solvents with both high absorption performance as well as high desorption performance. The chart summarizes the absorption and desorption performance of all the amines tested. From the chart, Solvent 23 has the highest absorption and desorption performance. Based on those two parameters, this solvent was selected for further degradation and emission testing in a pilot plant under practical $CO_2$ capture conditions.

Example 5—Amine Degradation and Ammonia ($NH_3$) Emission Tests

Figure 5:
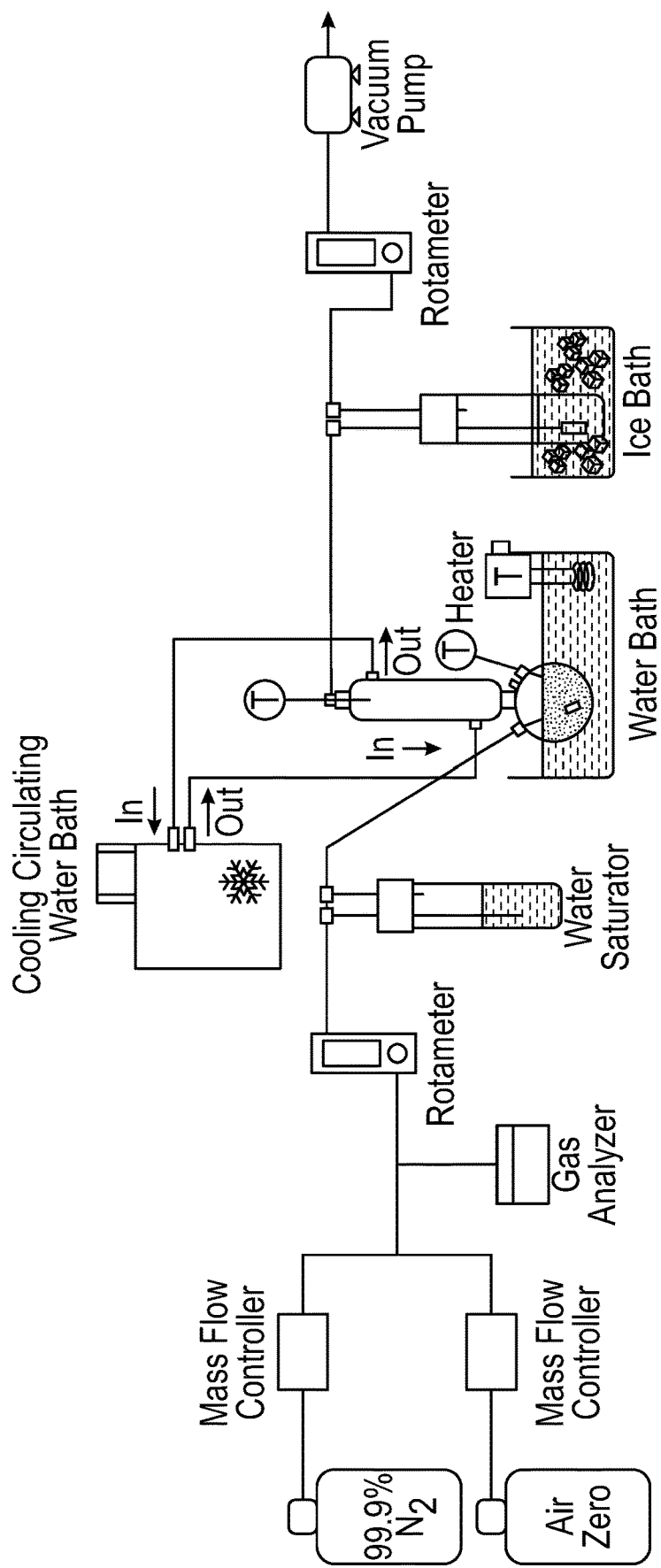
FIG. 5 illustrates an experimental set-up used to assess amine degradation and $NH_3$ emission of various exemplary solvents of the present invention.

Experiments were carried out to assess ammonia emissions of several solvents listed in Table 1. FIG. 5 is a schematic diagram illustrating the experimental setup for assessing amine degradation and $NH_3$ emission. In the experiments performed using the experimental setup depicted in FIG. 5, 250 mL of the desired amine solution of a desired concentration and $CO_2$ loading was prepared by mixing predetermined masses of the desired amine components with deionized water. The $CO_2$ gas was bubbled through the amine solution until the desired $CO_2$ loading (the desired $CO_2$ loading of each amine solution was the average of rich and lean $CO_2$ loadings) was obtained. Confirmation of $CO_2$ loading value of the amine was carried by titration against standard solution of 1 kmol/m$^3$ HCl, whereby $CO_2$ was liberated and measured for its quantity by displacement of NaCl/NaHCO$_3$/methyl orange mixture. The loading was calculated on a basis of mol $CO_2$ per one mol amine. 250 mL amine solution was placed in the reaction flask and warmed up to 60±2° C. in a controlled temperature water bath. A condenser designed to control the temperature of its outlet to be equal to the temperature of the inlet feed gas was connected to one of the reaction flask openings. This helped prevent amine/water from being lost by evaporation and feed-gas carry-over. When the solution reached the set temperature, the feed gas premixed to contain 10% O2 (N$_2$ balance) set at the flow rate of 200±2 mL/min by a rotameter (AaLBORG, model GFC-17 with range of 0-500 ml/min±1.5% error) was bubbled sequentially into the water saturator and finally the solution in the reaction flask via gas diffuser. The reaction was kept running continuously for 4 weeks while the degraded amine samples were collected every day and sent for amine concentration analysis with GC/MS and HPLC, both of which were purchased from Agilent Technologies, Canada, to test for degradation.

To assess off-gas emissions of the amines, gaseous $NH_3$ evolving from the reaction was also collected from the off-gas produced from the possible degradation reaction. The outlet of the condenser attached directly to the reaction flask was connected to the inlet of the impinger bottle filled with 50 mL of 0.05 M $H_2SO_4$ to trap the $NH_3$ formed from the amine degradation reaction. The impinger bottle was kept in an ice bath the whole time during sampling to ensure that all the $NH_3$ released was being fully collected in the impinge solution. The outlet of the impinger was also connected with the rotameter and then vacuum pump set at 200±2 mL/min similar to that set for the feed gas flow rate. The match of the two (2) flow rates was needed to prevent the $NH_3$ from being under/over sampled. The sampling continued for one hour after which the impinger was disconnected completely from the condenser outlet. The impinger solution was then transferred into a 100 mL volumetric flask. A fresh 0.05M $H_2SO_4$ solution was also used to rinse the impinger bottle which was then poured back into the 100 mL flask. The flask was finally topped with the $H_2SO_4$ to 100 mL mark. The $NH_3$ was collected at different time intervals starting at the first, third, fifth, 24th and 27th hour after which the collection was done once a day for 14 days. The collected samples were placed in the refrigerator before sending for analysis using the Ammonia/Nitrate Analyzer (Timberline Model TL-2800).

Figure 6:
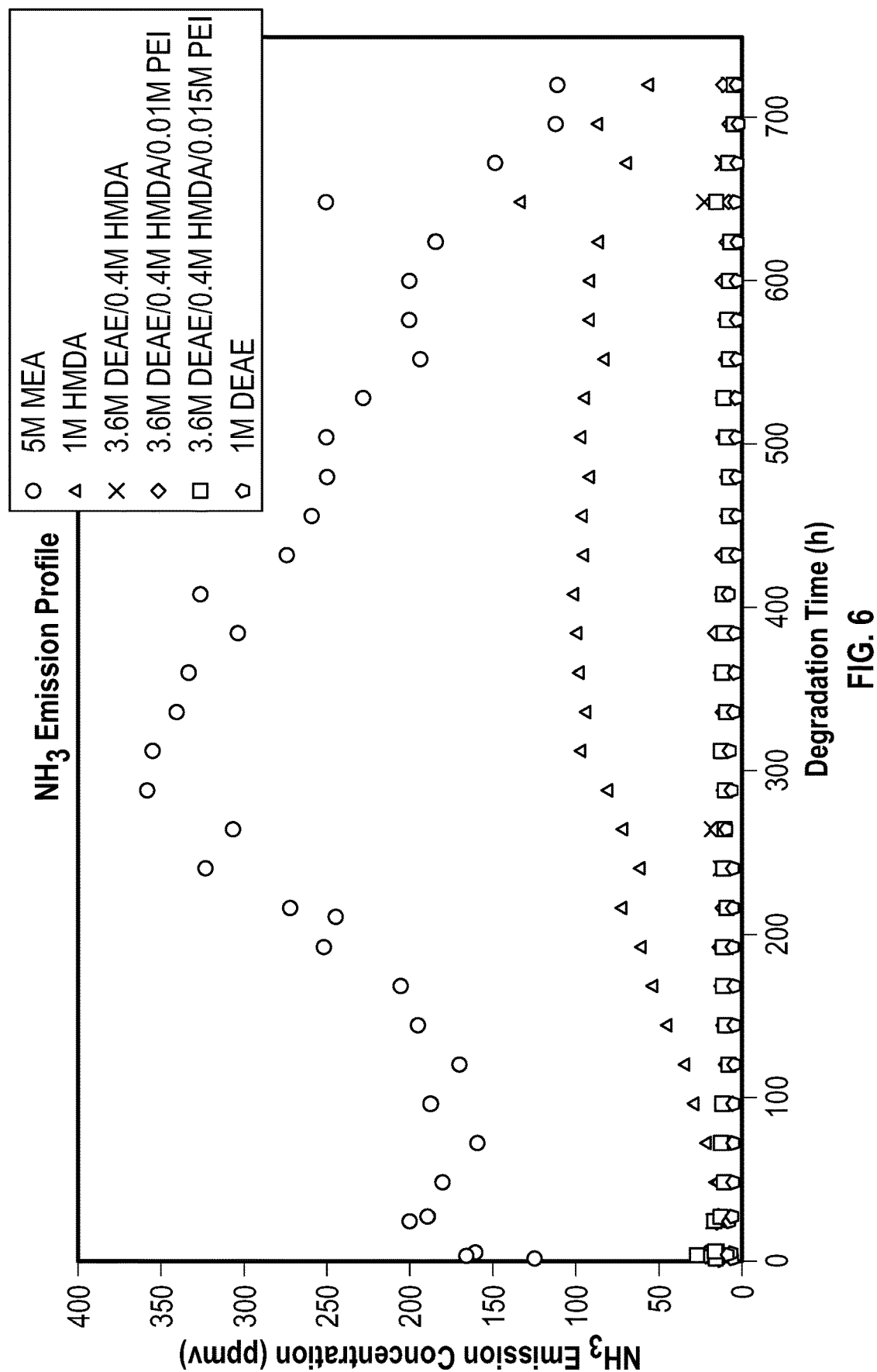
FIG. 6 shows the experimentally measured $NH_3$ emission profiles of various exemplary solvents of the present invention.

FIG. 6 shows $NH_3$ emission profiles of the following solvent blends: 5 mol/L MEA, 3.6 mol/L DEAE+0.4 mol/L HMDA+0.01 mol/L PEI, 3.6 mol/L DEAE+0.4 mol/L HMDA+0.015 mol/L PEI, 3.6 mol/L DEAE+0.4 mol/L HMDA, 1 mol/L HMDA, and 1 mol/L DEAE.

FIG. 6 shows that the highest amount of $NH_3$ emitted was from MEA solution as a result of 02 degradation. Based on FIG. 6, MEA emitted $NH_3$ in a range of 112 to 360 ppmv after the solution had been degraded by $O_2$ for 720 hours (30 days). Emissions of $NH_3$ derived from the degradation reaction of 3.6 mol/L DEAE+0.4 mol/L HMDA+0.01 mol/L PEI mixed solvent (Solvent 23) was also shown in FIG. 6. The mixed solvent (Solvent 23) emitted $NH_3$ in a range of 8 to 22 ppmv during 720 hours. It is clear that the emissions of the mixed solvent (Solvent 23) was at least one (1) order of magnitude less than that of MEA. This indicates that the solvent has good resistance to degradation and/or can keep the $NH_3$ generated from the oxidative degradation in the liquid phase. 3.6 mol/L DEAE+0.4 mol/L HMDA+0.015 mol/L PEI mixed solvent showed similar range of $NH_3$ emission to that of the Solvent 23 mixture (with 0.01 mol/L PEI) also shown in FIG. 6.

The mixture containing only 3.6 mol/L DEAE+0.4 mol/L HMDA emitted between 4 to 22 ppmv of $NH_3$ which was also the same as those of the blended amines tested in this experiment. The single amines comprising 1 mol/L HMDA and 1 mol/L DEAE were also tested with their $NH_3$ emission profiles included in FIG. 6. The emission ranges of the two single amines were 13 to 134 ppmv and 2 to 10 ppmv, respectively.

Figure 7:
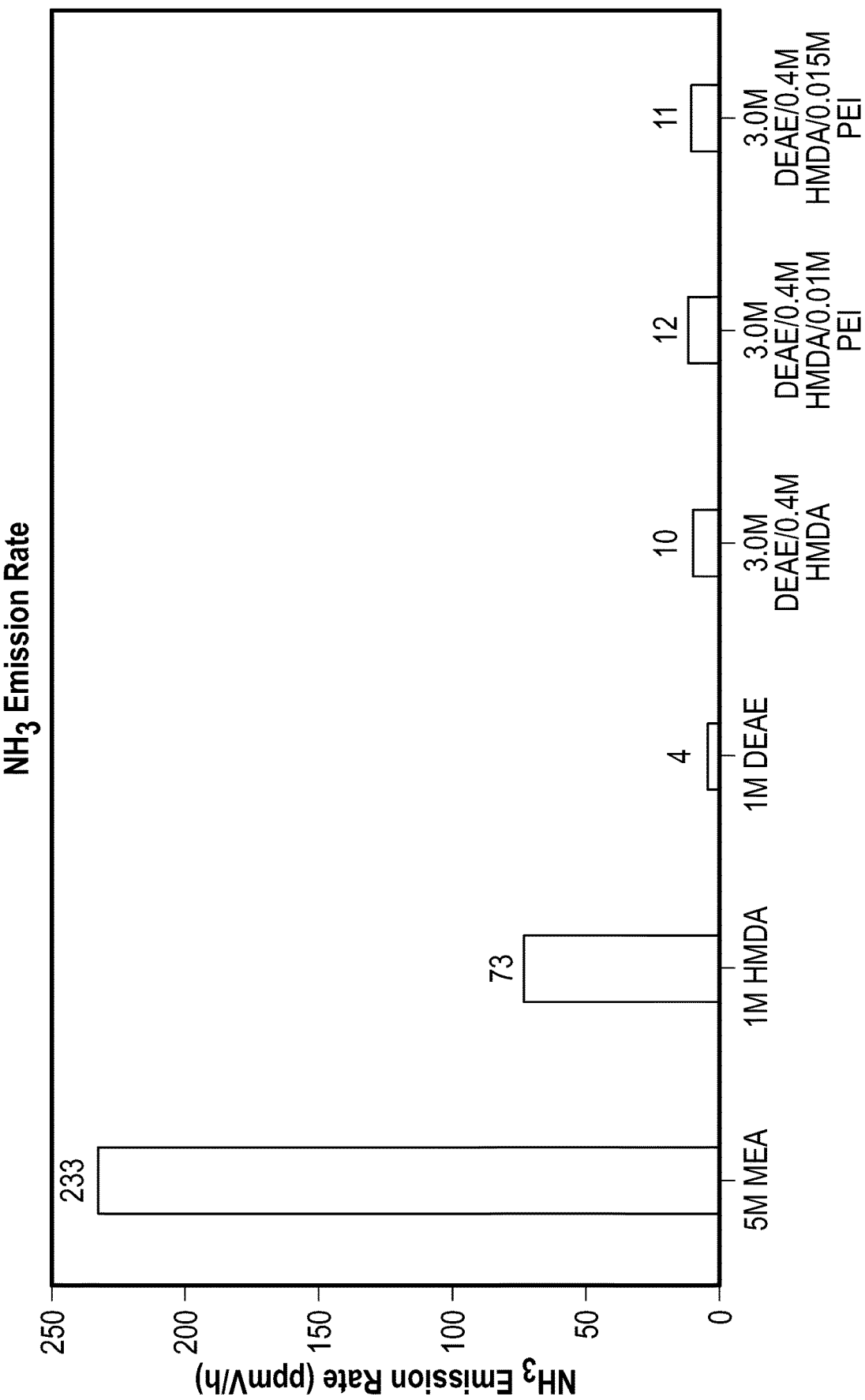
FIG. 7 shows the hourly averaged $NH_3$ emissions of various solvents after 180 hours degradation.

FIG. 7 shows hourly averaged $NH_3$ emissions of the solvent blends of FIG. 6. For the blended amines, the emissions of 3.6 mol/L DEAE+0.4 mol/L, 3.6 mol/L DEAE+0.4 mol/L HMDA+0.010 mol/L PEI, and 3.6 mol/L DEAE+0.4 mol/L HMDA+0.05 mol/L PEI are the same with the averaged emissions being 10, 12, and 11 ppmv, respectively. All blended amines had lower emissions than that of 5 mol/L MEA whose average $NH_3$ emitted hourly was 233 ppmv. 1 mol/L HMDA and 1 mol/L DEAE were also tested with their $NH_3$ emission profiles included in FIG. 7. The averaged emissions of 1 mol/L HMDA and 1 mol/L DEAE, also included in FIG. 7, were 73 and 4 ppmv, respectively.

Figure 8:
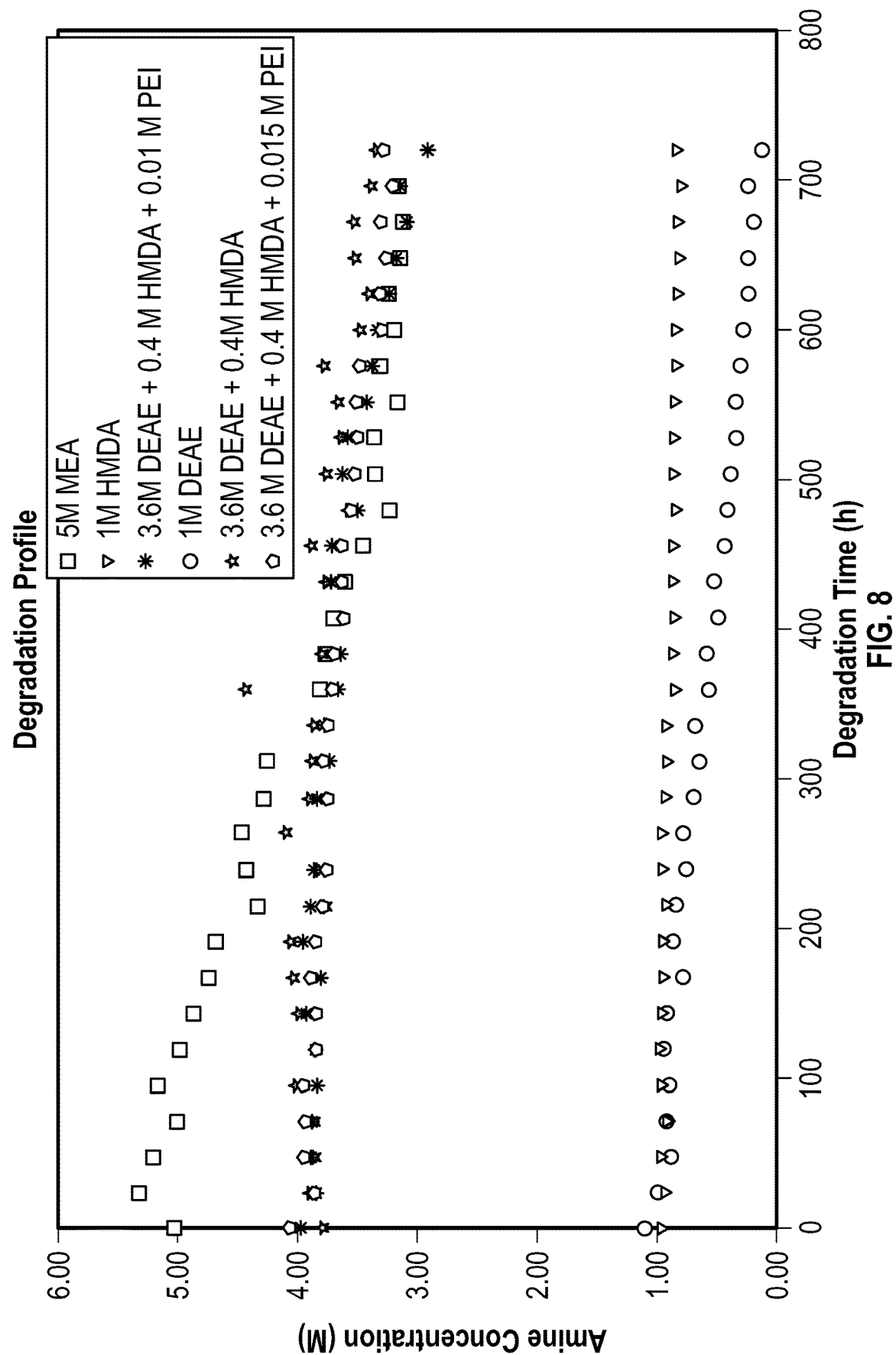
FIG. 8 shows the experimentally measured degradation vs. time profiles of various exemplary solvents of the present invention.

FIG. 8 shows degradation-time profiles of all the solvents tested which are 5M MEA, 1M HMDA, 1M DEAE, 3.6 mol/L DEAE+0.4 mol/L, 3.6 mol/L DEAE+0.4 mol/L HMDA+0.010 mol/L PEI, and 3.6 mol/L DEAE+0.4 mol/L HMDA+0.05 mol/L PEI. Based on FIG. 8, the slope of the graph shows MEA degraded at the fastest rate, with its concentration reducing from 5M to approximately 3.4M within 720 h degradation time. All the blended amines of 3.6 mol/L DEAE+0.4 mol/L, 3.6 mol/L DEAE+0.4 mol/L HMDA+0.010 mol/L PEI, and 3.6 mol/L DEAE+0.4 mol/L HMDA+0.05 mol/L PEI degraded at a much slower rates as can be seen clearly from the less steep degradation-time profiles slopes. IM DEAE degraded at a similar rate to that of the blends while 1M HMDA degraded at the slowest rate compared to all the amines tested in this work.

Figure 9:
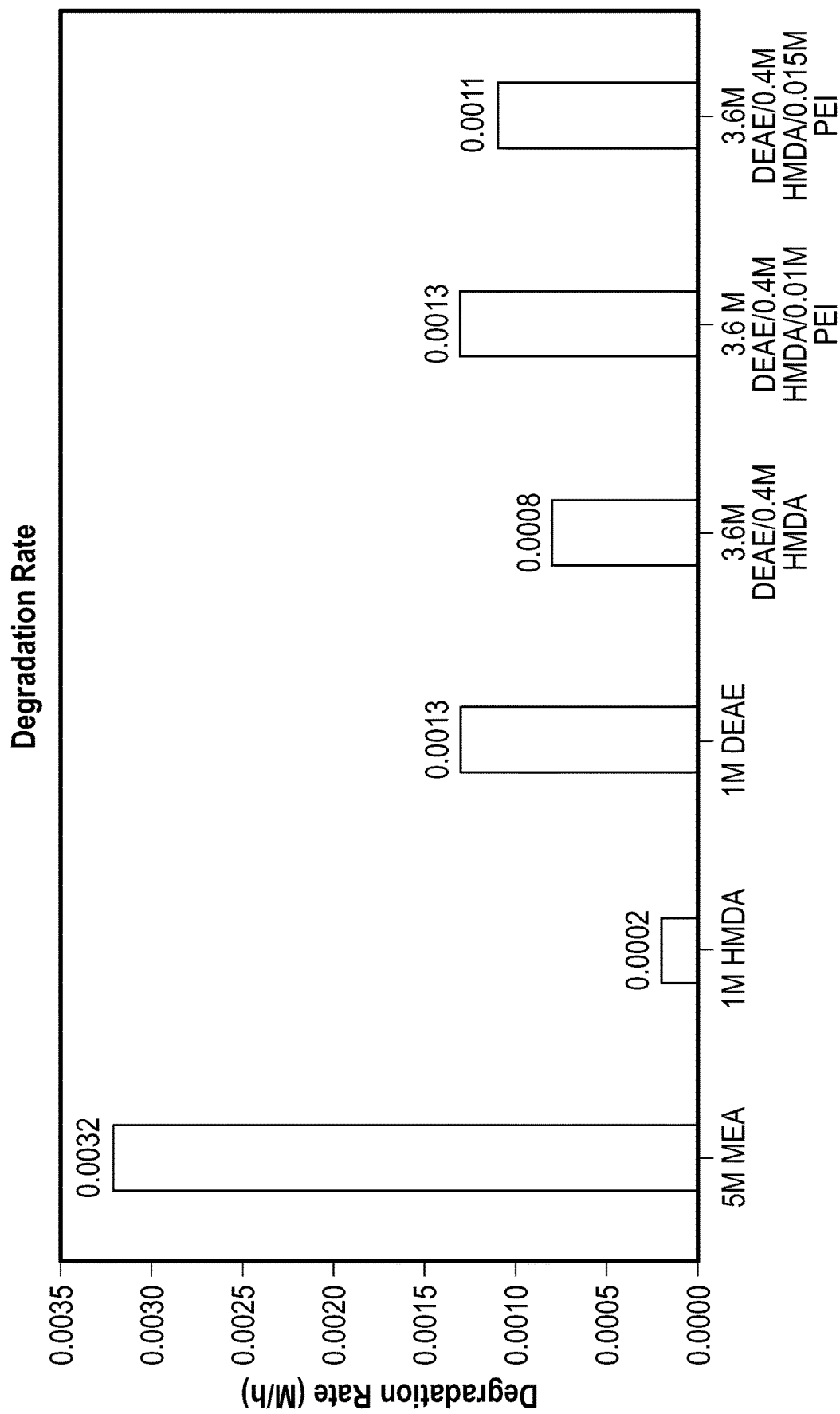
FIG. 9 is a bar graph comparing the degradation rate of various exemplary solvents of the present invention.

FIG. 9 compares overall degradation rates of all the solvents after being contacted with $O_2$ gas for 720 h. It is clear that the blended solvents outperformed the benchmark MEA as they all degraded at 60-75% slower rates than that of MEA. Based on FIG. 9, degradation rates of MEA, 3.6 mol/L DEAE+0.4 mol/L, 3.6 mol/L DEAE+0.4 mol/L HMDA+0.010 mol/L PEI, and 3.6 mol/L DEAE+0.4 mol/L HMDA+0.05 mol/L PEI are 0.0032, 0.0008, 0.0013, and 0.0011 M/h, respectively. Degradation rates of 1M HMDA and IM DEAE are also included in the same figure for comparison. The rates for 1M HMDA and IM DEAE are 0.0002 and 0.0013 M/h, respectively.

Example 6—Viscosity, Density, Thermal Conductivity, Heat Capacity

The viscosity, density, thermal conductivity and heat capacity were measured for different solvents (i.e., the high performance solvents) for the unloaded, loaded and mid-loaded samples at a temperature range of 30° C.-50° C. as shown in Tables 3-5 below.

A Digital Anton Paar micro viscometer model (Lovis-2000 M/ME) was used to measure the viscosities in mPas. This micro viscometer works by using the rolling ball principle which employs three inductive sensors to measure the time it takes for the ball to move through the liquid filled capillary. High quality deionized water was used to calibrate the equipment after each run. Prior to each measurement, the sample was kept inside the viscometer until the set temperature reached equilibrium condition. The accuracy was within 0.5% for viscosity and ±0.02° C. for temperature.

Densities were measured using DMA 4500M from Anton Paar with an accuracy of 0.00001 $g/cm^3$ for density and 0.01° C. for temperature. Prior to using the equipment for measurements, air and water checks were done in order to validate and calibrate the equipment. High quality deionized water was used to calibrate the equipment after each run. Prior to each measurement, the sample was kept inside the viscometer until the set temperature reached equilibrium condition.

A thin platinum wire was immersed in the amine sample and measured the heat resistance profile of wire is with respect to time. A temperature-time profile of the amine samples was generated. These plots were used to determine thermal conductivity, thermal diffusivity, and heat capacity. Thermal conductivity and diffusivity were measured specifically at the beginning when temperature become stable, and then using the correlation of thermal diffusivity and heat capacity $(D=K/(\rho\ Cp))$, heat capacity will be computed at different time intervals. It should be noted that measurement of heat capacity required an input of predetermined density values of the sample at 3-4 temperatures for the software to be able to plot the density-temperature profile for later computation of heat capacity at different temperatures. These were provided using density data obtained from the density measurement. At least 3 repeated measurements of thermal properties were taken for each sample which their averaged values were used and reported.

Table 3 below shows the density of various amine solvents at 30° C., 40° C. and 50° C.

TABLE 3

Summary table showing the density of various solvents at 30° C., 40° C. and 50° C.

| Amine | Density, g/ml | | | Loading |
| --- | --- | --- | --- | --- |
| | 30° C. | 40° C. | 50° C. | |
| 3.6M DEAE + 0.4M HMDA | 0.997 | 0.989 | 0.981 | 0.2 |
| 3.6M DEAE + 0.4M HMDA + 0.01M PEI | 1.001 | 0.994 | 0.986 | 0.21 |
| 3.6M DEAE + 0.4M HMDA + 0.015M PEI | 1.003 | 0.995 | 0.987 | 0.21 |
| 5M MEA (unloaded) | 1.009 | 1.004 | 0.998 | 0 |
| rich 5M MEA | 1.089 | 1.084 | 1.079 | 0.37 |
| lean 5M MEA | 1.046 | 1.041 | 1.035 | 0.24 |
| rich 3.6M DEAE + 0.4M HMDA | 1.025 | 1.017 | 1.01 | 0.35 |
| rich 3.6M DEAE + 0.4M HMDA + 0.01M PEI | 1.029 | 1.021 | 1.013 | 0.36 |
| rich 3.6MDEAE + 0.4MHMDA + 0.015M PEI | 1.027 | 1.019 | 1.011 | 0.36 |
| 3.6M DEAE + 0.4M HMDA (unloaded) | 0.959 | 0.947 | 0.937 | 0 |
| 3.6M DEAE + 0.4M HMDA + 0.01M PEI (unloaded) | 0.956 | 0.947 | 0.938 | 0 |
| 3.6M DEAE + 0.4M HMDA + 0.015M PEI (unloaded) | 0.956 | 0.943 | 0.934 | 0 |

Table 4 shows the viscosity of various amine solvents at 30° C., 40° C. and 50° C.

TABLE 4

Summary table showing the viscosity of various solvents at 30° C., 40° C. and 50° C.

| Amine | Viscosity, mPa · s | | | Loading |
| --- | --- | --- | --- | --- |
| | 30° C. | 40° C. | 50° C. | |
| 3.6M DEAE + 0.4M HMDA | 7.052778 | 5.009285 | 4.213395 | 0.2 |
| 3.6M DEAE + 0.4M HMDA + 0.01M PEI | 7.419191 | 5.56404 | 4.565862 | 0.21 |
| 3.6M DEAE + 0.4M HMDA + 0.015M PEI | 7.553406 | 5.717488 | 4.63913 | 0.21 |
| 5M MEA (unloaded) | 2.731363 | 2.672648 | 2.661666 | 0 |
| rich 5M MEA | 3.360654 | 3.314872 | 3.25858 | 0.37 |
| lean 5M MEA | 3.18507 | 3.052212 | 2.98287 | 0.24 |
| rich 3.6M DEAE + 0.4M HMDA | 8.5526 | 6.223023 | 5.0197 | 0.35 |
| rich 3.6M DEAE + 0.4M HMDA + 0.01M PEI | 9.249681 | 6.66713 | 5.355731 | 0.36 |
| rich 3.6MDEAE + 0.4MHMDA + 0.015M PEI | 9.336457 | 6.769217 | 5.371443 | 0.36 |
| 3.6M DEAE + 0.4M HMDA (unloaded) | 4.885146 | 3.916792 | 3.329161 | 0 |
| 3.6M DEAE + 0.4M HMDA + 0.01M PEI (unloaded) | 5.122248 | 4.046531 | 3.457468 | 0 |
| 3.6M DEAE+ 0.4M HMDA + 0.015M PEI (unloaded) | 5.871752 | 4.519799 | 3.748142 | 0 |

Table 5 shows the thermal conductivity, diffusivity and heat capacity of various solvents at 30° C., 40° C. and 50° C.

TABLE 5

Summary table showing thermal conductivity, diffusivity and heat capacity of different solvents at 30° C., 40° C. and 50° C.

| Amine | Temperature ° C. | Thermal Conductivity, mW/mK | Diffusivity, *10^−8 m2/s | Cp, kJ/kgK | Loading, mol $CO_2$/mol amine |
| --- | --- | --- | --- | --- | --- |
| 3.6M DEAE + 0.4M HMDA + 0.01M PEI (unloaded) | 30 | 341.39 | 10.62 | 3.36 | 0.00 |
| | 40 | 340.41 | 10.43 | 3.45 | 0.00 |
| | 50 | 339.09 | 10.23 | 3.54 | 0.00 |
| lean 5M MEA | 30 | 454.72 | 12.38 | 3.51 | 0.24 |
| | 40 | 459.13 | 12.59 | 3.50 | 0.24 |
| | 50 | 458.36 | 12.72 | 3.48 | 0.24 |
| 3.6M DEAE + 0.4M HMDA + 0.01M PEI | 30 | 347.71 | 10.69 | 3.25 | 0.21 |
| | 40 | 345.78 | 10.49 | 3.32 | 0.21 |
| | 50 | 344.85 | 10.29 | 3.40 | 0.21 |
| 3.6M DEAE + 0.4M HMDA | 30 | 346.81 | 10.68 | 3.26 | 0.20 |
| | 40 | 344.75 | 10.48 | 3.33 | 0.20 |
| | 50 | 342.15 | 10.26 | 3.40 | 0.20 |
| 3.6M DEAE + 0.4M HMDA + 0.015M PEI | 30 | 349.84 | 10.72 | 3.25 | 0.21 |
| | 40 | 347.55 | 10.51 | 3.32 | 0.21 |
| | 50 | 345.33 | 10.30 | 3.40 | 0.21 |
| rich 3.6M DEAE + 0.4M HMDA | 30 | 352.78 | 10.75 | 3.20 | 0.35 |
| | 40 | 349.82 | 10.53 | 3.27 | 0.35 |
| | 50 | 348.83 | 10.34 | 3.34 | 0.35 |

TABLE 5-continued

Summary table showing thermal conductivity, diffusivity and heat capacity of different solvents at 30° C., 40° C. and 50° C.

| Amine | Temperature ° C. | Thermal Conductivity, mW/mK | Diffusivity, *10^-8 m2/s | Cp, kJ/kgK | Loading, mol CO$_2$/mol amine |
|---|---|---|---|---|---|
| rich 3.6M DEAE + 0.4M HMDA + 0.01M PEI | 30 | 353.55 | 10.76 | 3.19 | 0.36 |
|  | 40 | 351.58 | 10.55 | 3.26 | 0.36 |
|  | 50 | 349.22 | 10.34 | 3.33 | 0.36 |
| rich 3.6M DEAE + 0.4M HMDA + 0.015M PEI | 30 | 351.67 | 10.74 | 3.19 | 0.36 |
|  | 40 | 350.45 | 10.54 | 3.26 | 0.36 |
|  | 50 | 350.58 | 10.36 | 3.35 | 0.36 |
| 3.6M DEAE+ 0.4M HMDA + 0.015M PEI (unloaded) | 30 | 331.2 | 10.50 | 3.30 | 0.00 |
|  | 40 | 330.02 | 10.31 | 3.40 | 0.00 |
|  | 50 | 328.29 | 10.11 | 3.48 | 0.00 |
| 3.6M DEAE + 0.4M HMDA (unloaded) | 30 | 342.97 | 10.64 | 3.36 | 0.00 |
|  | 40 | 340.89 | 10.43 | 3.45 | 0.00 |
|  | 50 | 339.48 | 10.23 | 3.54 | 0.00 |
| 5M MEA (unloaded) | 30 | 466.57 | 12.54 | 3.69 | 0.00 |
|  | 40 | 474.86 | 12.81 | 3.69 | 0.00 |
|  | 50 | 481.63 | 13.05 | 3.70 | 0.00 |
| rich 5M MEA | 30 | 483.53 | 12.78 | 3.48 | 0.37 |
|  | 40 | 486.29 | 12.97 | 3.46 | 0.37 |
|  | 50 | 486.8 | 13.13 | 3.44 | 0.37 |

Example 7—Mass Transfer Coefficient

Pilot plant testing was carried out in order to be able to assess the performance of a solvent according to a preferred embodiment of the present invention against a commonly used solvent, MEA. Solvent 23 (3.6M DEAE+0.4M HMDA+0.01M PEI) and MEA were run at full cycle in the pilot plant, mimicking close to real conditions.

The results of CO$_2$ capture performance of 3.6M DEAE+ 0.4M HMDA+0.01M PEI solvent obtained from a full absorption-desorption cycle pilot plant. The performance runs for 3.6M DEAE+0.4M HMDA+0.01M PEI solvent were carried out at 110° C. and 120° C. and compared with 5 MEA solvent also run using the same pilot plant and conditions as was used for 3.6M DEAE+0.4M HMDA+ 0.01M PEI solvent. This test of MEA was carried out so that its performance could be used to compare with 3.6M DEAE+0.4M HMDA+0.01M PEI solvent at the same temperature.

At the beginning of each run, the amine solution of the desired concentration and flow rate is pumped from the storage tank via the variable-speed gear pump to the top of the absorber. Meanwhile, the heater is switched on and set to the desired set point temperature which is used to heat up the rich amine from the absorber prior to entry into the desorber. Once amine solvent circulation is set, a mixture of CO$_2$, N$_2$ and air gases at the selected CO$_2$ partial pressure and concentration is then introduced to the bottom of the absorber column through the gas flow meter, which controls the gas flows individually.

This allows for the gas to contact the down flowing liquid amine in a countercurrent manner. Treated gas leaves the top of the column, while the rich amine solvent leaves the absorber bottom and is preheated by the hot lean amine stream (coming from the bottom of the desorber) before re-entering the desorber for desorption of CO$_2$. CO$_2$ is desorbed from the rich amine in the desorber by heat supplied from the heater (reboiler). The lean amine, which now leaves the bottom of the desorber, is cooled by lean-rich heat exchanger and the cooler and fed into the absorber column for the cycle to continue.

The CO$_2$ product gas at the top of the desorber is cooled by the condenser to remove any entrained water/amine and is dry before vented to the air. When the system has reached steady state, both the rich and lean amine samples are taken for CO$_2$ loading analysis using titration and CO$_2$ displacement technique. The temperature profile readings are also taken along the height of the absorber column using J-type thermocouples which are installed along the height of the column. The performance of the solvent used in the run is presented in terms of CO$_2$ production rate, absorber efficiency, heat duty, gas and liquid mass transfer coefficients.

The plant was designed for a flow rate of 25 SLPM of feed gas containing 15% CO$_2$. The liquid flow rate of amine was set at 50 mL/min. The conditions used for both run temperatures were feed gas flow rate of 25 SLPM and liquid amine flow rate of 50 mL/min. The CO$_2$ concentration in flue gas was 4% which was one quarter of the CO$_2$ concentration used to design the plant. The implication is that the volume of amine available is capable of absorbing all of CO$_2$ at 4% based on the height of the column. So, for some criteria, it may not be easy to explicitly separate the performance of MEA and the 3.6M DEAE+0.4M HMDA+0.01M PEI solvent (most gas phase parameters such as off-gas concentration and absorber efficiency would be affected). To take into account various limitations such as the set up and the heating medium, the experiments were carried out at a pressure of 5 psi in the desorber when running at a desorption temperature of 110° C. and at a pressure of 10 psi in the desorber when running at 120° C. Due to the different operating pressures for the two regeneration temperatures it is inappropriate to compare the true effect of temperature on the performance of each solvent due to the extra parameter, pressure, that is added. Operating at a higher desorption pressure limits the desorption process and as a result, this effect leads to an overall lower performance observed in both 3.6M DEAE+0.4M HMDA+0.01M PEI solvent and MEA at the higher pressure at 120° C. when compared with 110° C. Thus, within this scope of work the comparison was limited to that between 3.6M DEAE+0.4M HMDA+0.01M PEI solvent and MEA at the same temperature. Table 6 shows the run conditions used for the tests.

Table 6 shows a summary of run conditions for 3.6M DEAE+0.4M HMDA+0.01M PEI and MEA solvents

TABLE 6

Summary table of run conditions for 3.6M DEAE + 0.4M HMDA + 0.01M PEI and MEA solvents

| Parameter | Conditions |
| --- | --- |
| Gas flow rate, SLPM | 25 |
| Amine Flow Rate, ml/min | 50 |
| $CO_2$ Concentration in gas, % | 4 |
| $CO_2$ Concentration in feed gas, % | 10 |
| Feed Gas inlet Temperature, ° C. | 25 |
| Desorption Temperature, ° C. | 110, 120 |
| Cooling Water inlet temperature to absorber, ° C. | 3 to 4 |
| Cooling Water Inlet temperature to desorber, ° C. | 3 to 4 |

Table 7 summarizes performance run parameters used for comparing the 3.6M DEAE+0.4M HMDA+0.01M PEI and MEA solvents at 110° C. The values for 3.6M DEAE+0.4M HMDA+0.01M PEI solvent at this temperature were averaged values from 2 repeated run while those for MEA were obtained from one test. Results at 120° C. for 3.6M DEAE+0.4M HMDA+0.01M PEI solvent are also given in Table 8.

Each test was conducted for more than 24 hr. This was to ensure that the run was stable and reached equilibrium before any measurements were taken. This condition was ensured for both solvents. Table 7 and 8 respectively summarize performance run parameters for 110° C. and 120° C. for 3.6M DEAE+0.4M HMDA+0.01M PEI and MEA solvents.

Table 7 shows a summary of performance run parameters at 110° C. for 3.6M DEAE+0.4M HMDA+0.01M PEI and MEA.

TABLE 7

Summary table of performance run parameters at 110° C. for 3.6M DEAE + 0.4M HMDA + 0.01M PEI and MEA

| | Solvent System | | % enhancement |
| --- | --- | --- | --- |
| Parameter | 3.6M DEAE + 0.4M HMDA + 0.01M PEI Solvent | MEA | of 3.6M DEAE + 0.4M HMDA + 0.01M PEI solvent relative to MEA |
| Absorber Efficiency, % (based on liquid side) | 93.9 | 83.71 | 12 |
| $K_G av_{-ave}$ (kmol/hr · $m^3$ · kPa) (based on liquid side) | 0.79 | 0.47 | 68 |
| LIQ $K_L av(hr^{-1})$ | 2.72 | 0.52 | 426 |
| $CO_2$ Production, g/hr | 131 | 117 | 12 |
| REBOILER DUTY (kJ/hr) | 1980 | 1980 | N/A |
| HEAT LOSS (kJ/hr) * | 1079 | 1079 | N/A |
| Heat Duty (with heat loss), GJ/tonne $CO_2$ | 6.89 | 7.73 | −11 |
| Heat Duty (without heat loss), GJ/tonne $CO_2$ | 15.15 | 16.98 | −11 |

* (Heat loss is calculated around the reboiler alone; other areas that provide inefficiencies will result in bigger heat loss)

Table 8 shows a summary of performance run parameters at 120° C. for 3.6M DEAE+0.4M HMDA+0.01M PEI and MEA.

TABLE 8

Summary table of performance run parameters at 120° C. for 3.6M DEAE + 0.4M HMDA + 0.01M PEI and MEA

| | Solvent System | | % enhancement |
| --- | --- | --- | --- |
| Parameter | 3.6M DEAE + 0.4M HMDA + 0.01M PEI Solvent | MEA | of 3.6M DEAE + 0.4M HMDA + 0.01M PEI solvent relative to MEA |
| Absorber Efficiency, % (based on liquid side) | 86.32 | 76.11 | 13 |
| $K_G av_{-ave}$ (kmol/hr · $m^3$ · kPa) (based on liquid side) | 0.55 | 0.38 | 45 |
| LIQ $K_L av(hr^{-1})$ | 2.33 | 0.49 | 376 |
| $CO_2$ Production, g/hr | 112.5 | 99.4 | 13 |
| REBOILER DUTY (kJ/hr) | 4140.5 | 4140.5 | N/A |
| HEAT LOSS (kJ/hr) * | 2111.45 | 2111.45 | N/A |
| Heat Duty (with heat loss), GJ/tonne $CO_2$ | 36.8 | 41.66 | −12 |
| Heat Duty (without heat loss), GJ/tonne $CO_2$ | 18.03 | 20.41 | −12 |

* (Heat loss is calculated around the reboiler alone; other areas that provide inefficiencies will result in bigger heat loss)

Absorber efficiency can be calculated accurately based on both gas and liquid measurements. The gas side efficiency is shown by the percent difference of the amounts of $CO_2$ entering and leaving the absorber. The liquid side efficiency on the other hand, is determined based on the amount of $CO_2$ absorbed and released from the amine solvent (rich and lean $CO_2$ loadings) compared to the total $CO_2$ amount from the feed gas entering the absorber. Although two methods of calculation could be used, absorber efficiencies of all 3.6M DEAE+0.4M HMDA+0.01M PEI solvent and MEA runs at 110° C. and 120° C. were only taken from liquid side measurement which were accurate. Direct measurement from gas side efficiency for both solvents were not included due to insufficient data points of off-gas $CO_2$ concentration used to obtain amount of $CO_2$ leaving the absorber for calculation. When such data were used to determine absorber efficiency, there was very high uncertainty in the value that was obtained. Therefore, absorber efficiency determined based on direct gas measurement was not used. The absorber efficiency was calculated using Equation (7):

$$\frac{(\infty_r - \infty_l) * [Amine] * \text{Amine}}{y_{CO_2} * G} * 100, \text{ where} \tag{7}$$

$\infty_r$, rich loading, mol $CO_2$/mol amine
$\infty_l$, lean loading, mol $CO_2$/mol amine
[Amine], Amine concentration, mol amine/L·soltn
Amine, Amine circulation/flow rate, L/min
$y_{CO_2}$, $CO_2$ concentration, %
G, Feed Gas flow rate, L/min Based on Table 7, absorber efficiencies of 3.6M DEAE+0.4M HMDA+0.01M PEI and MEA at 110° C. are 93.90% and 83.71%. This represents a 12% increase of the absorber efficiency when 3.6M DEAE+0.4M HMDA+0.01M PEI solvent was compared with MEA solvent. A higher absorber efficiency obtained for 3.6M DEAE+0.4M HMDA+0.01M PEI solvent implies having a huge opportunity to use a shorter absorber than with MEA. From Table 8, absorber efficiencies of 3.6M DEAE+0.4M HMDA+0.01M PEI solvent and MEA at 120° C. are 86.32% and 76.11%; this represents 13% increase of the absorber efficiency when 3.6M DEAE+0.4M HMDA+0.01M PEI solvent was used in comparison with MEA solvent.

Mass transfer coefficient were calculated based on both liquid and gas phases. The gas phase mass transfer coefficient ($K_Gav$) calculation is done based on two $CO_2$ concentration data points which are those of $CO_2$ entering (from feed gas concentration) and leaving (from absorber off-gas) the absorber column. The liquid phase mass transfer coefficient ($K_Lav$) on the other hand, is determined based on the amount of $CO_2$ absorbed and desorbed from the amine solvent (from rich and lean $CO_2$ loadings). As mentioned previously, absorber off-gas $CO_2$ concentration data were not sufficiently high enough to allow Krav to be accurately calculated directly. To calculate the $K_Gav$ values of both 3.6M DEAE+0.4M HMDA+0.01M PEI solvent and MEA with accuracy, liquid phase absorber efficiencies determined respectively for 3.6M DEAE+0.4M HMDA+0.01M PEI and MEA were first used to obtain the corresponding average $CO_2$ concentration in the absorber off-gas for both solvents. The off-gas $CO_2$ concentrations were then further used together with all other data measured directly from the tests to calculate the values of $K_Gav$.

As seen in Table 7, $K_Gav$ of 3.6M DEAE+0.4M HMDA+0.01M PEI solvent and MEA solvent determined based on liquid side efficiency are 0.79 and 0.47 kmol/hr·m³·kPa, respectively at 110° C. This shows 68% enhancement of 3.6M DEAE+0.4M HMDA+0.01M PEI solvent relative to MEA. From Table 8, the $K_Gav$ of 3.6M DEAE+0.4M HMDA+0.01M PEI solvent and MEA are 0.55 and 0.38 kmol/hr·m³ kPa, respectively at 120° C. This represents a 45% enhancement of 3.6M DEAE+0.4M HMDA+0.01M PEI solvent relative to MEA. The enhancement from the mini plant test is also consistent with the enhancement of absorption parameter used previously to evaluate 3.6M DEAE+0.4M HMDA+0.01M PEI solvent relative to MEA in the screening test (given in the previous report). The $K_Gav$ of 3.6M DEAE+0.4M HMDA+0.01M PEI solvent being higher than that of MEA indicates the 3.6M DEAE+0.4M HMDA+0.01M PEI solvent's ability to remove $CO_2$ more effectively and quickly. This also means, for a given height of absorber tower, 3.6M DEAE+0.4M HMDA+0.01M PEI solvent should be able to remove more $CO_2$ more quickly than MEA. This also suggests that the 3.6M DEAE+0.4M HMDA+0.01M PEI solvent should require a shorter absorber column to remove the same amount of $CO_2$ as MEA would in a longer absorber column.

$K_Lav$ of 3.6M DEAE+0.4M HMDA+0.01M PEI solvent, on the other hand, is overwhelmingly larger than that MEA with the values being 2.72 hr and 0.52 hr at 110° C. and 2.33 hr and 0.49 hr as can be seen in Tables 7 and 8. The Krav enhancement obtained from 3.6M DEAE+0.4M HMDA+0.01M PEI solvent relative to MEA is remarkably high which is 426% and 325% at 110° C. and 120° C., respectively. Similar to $K_Gav$, the same order of magnitude of $K_Lav$ enhancement produced by 3.6M DEAE+0.4M HMDA+0.01M PEI solvent was also observed from the screen test. This clearly shows an excellent $CO_2$ absorption and desorption ability of 3.6M DEAE+0.4M HMDA+0.01M PEI solvent that MEA does not have to the same extent. This result suggests that if a $CO_2$ plant being designed with 4 absorber per 1 desorber for an MEA system, with 3.6M DEAE+0.4M HMDA+0.01M PEI solvent, that same 1 desorber can handle the quadruple of the number of absorbers MEA would have handled, suggesting that the 3.6M DEAE+0.4M HMDA+0.01M PEI solvent with the same 1 unit desorber can handle 16 absorbers instead. The equations used for $K_Gav$ and Krav are shown in the following equations, Equation (8) and Equation (9):

$$K_G a_{v_{ave}} = \frac{G_1}{P(y_{CO2} - y^*_{CO2})lm}\left(\frac{Y_{CO2_{in}} - Y_{CO2_{out}}}{Z}\right) \quad (8)$$

Where, $G_1$ is the molar inert-gas flow rate (kmol/hr),
P is the column pressure, (kPa),
$yCO_2$, mole fraction of $CO_2$ in the bulk gas
$y^*CO_2$, mole fraction of $CO_2$ in the bulk gas in equilibrium with the liquid bulk
$YCO_{2in}$, mole ratio of $CO_2$ in
$YCO_{2out}$, mole ratio of $CO_2$ out $$K_L av = \left(\frac{\bar{L}}{(\overline{C_{AL}} - C_A^*)(1 - \overline{x_{AL}})}\right)\frac{(x_{AL\_T} - x_{AL\_B})}{Z} \quad (9)$$

Where $\bar{L}$ is the average liquid molar flux (kmol/m² hr),
$x_{AL\_T}$, is the mole fraction of $CO_2$ in the liquid bulk entering the desorber top,
$x_{AL\_B}$ is the mole fraction of $CO_2$ in the liquid bulk leaving the desorber bottom,
Z is the column height, m
$C_{AL}$, the average $CO_2$ concentration in the liquid bulk, kmol/m³
$x_{AL}$, is the average mole fraction of $CO_2$ in the liquid bulk
$C_A^*$, $CO_2$ concentration in the liquid in equilibrium with the bulk gas $CO_2$ production can be calculated based on gas and liquid measurement. The gas side calculation is normally calculated based on the $CO_2$ concentration difference between that of feed gas and absorber off-gas and flow rate of gas. Similar to absorber efficiency and gas side mass transfer analysis, the direct measurement on gas side did not have enough data. Thus, liquid side efficiency was used to first obtain the averaged $CO_2$ concentration in the absorber off-gas which was then used in $CO_2$ production calculation. The liquid side $CO_2$ production calculation is straightforward and determined from using the difference between rich and lean $CO_2$ loading and the amine flow rate. $CO_2$ production from gas and liquid sides of 3.6M DEAE+0.4M HMDA+0.01M PEI and MEA solvent are 131 and 117 g/hr, respectively at 110° C. and 112.5 and 99.4 g/hr at 120° C., representing a 12% enhancement. This is again due to the 3.6M DEAE+0.4M HMDA+0.01M PEI solvent's desorption ability that enables the solvent to release $CO_2$ almost completely during the desorption process. It is noteworthy to mention that even at a temperature of 110° C. 3.6M DEAE+0.4M HMDA+0.01M PEI solvent had a lean loading approximately close to zero. Operating at a higher temperature, 120° C. did not impact the lean loading of 3.6M DEAE+0.4M HMDA+0.01M PEI solvent in any way. As such, it is recommended to operate at 110° C., suggesting savings in energy.

Reboiler duty was determined from the difference in silicone oil temperatures entering and leaving the reboiler, heat capacity (Cp), and flow rate. Based on the two solvents' runs, their reboiler duties were approximately the same, thus average was taken and used for heat duty calculations of both solvents. Heat duties without heat loss reported as heat duty (based on liquid side) in Tables 7 and 8 were calculated based on reboiler duty divided by each amine's $CO_2$ amount removed from feed gas obtained from liquid analysis (rich and lean $CO_2$ loadings). Heat duties of 3.6M DEAE+0.4M HMDA+0.01M PEI solvent and MEA are 15.1 and 16.93 GJ/tonne $CO_2$, respectively at 110° C. and 20.41 and 18.03 GJ/tonne $CO_2$ at 120° C. These values corresponds to 11%-12% reduction (for the two temperatures) of heat duty when 3.6M DEAE+0.4M HMDA+0.01M PEI solvent was used in place of MEA. Heat duty on gas side (based on direct measurement) was not reported due to inadequacy of $CO_2$ off-gas concentration data explained previously.

Attempts to measure heat loss during the experiment were made so that heat duty described earlier could be adjusted so that the values would reflect closer to the actual heat duty value each amine could actually provide in a real commercial capture process. However, at this stage of the test, only heat loss around the reboiler could be estimated with acceptable accuracy. Other areas of heat losses were not performed. As can also be seen in Table 7 and 8, heat loss related to reboiler was estimated to be 1079 KJ/hr and 2111 kJ/hr at 110° C. and 120° C., respectively. The heat losses were then used to adjust the heat duty requirement of 3.6M DEAE+0.4M HMDA+0.01M PEI solvent and MEA solvent accordingly. If heat losses from other areas were also included in the heat duty calculation, it would result in even small heat duties for the two amines which would be closer to their actual values. The reboiler duty and heat duty were calculated based on the following equations, Equation (10) and Equation (11):

$$\text{Reboiler Duty, kJ/hr} = m^*Cp^*(T_{oil\ in} - T_{oil\ out}), \quad (10)$$

Where m is the mass flow rate of the oil, kg/hr
Cp is the heat capacity of the oil, KJ/kg° C.
$T_{oil\ in}$, is the oil inlet temperature, ° C.
$T_{oil\ in}$ is the oil inlet temperature, ° C.

$$\text{Heat Duty, GJ/tonne } CO_2 = \frac{\text{Reboiler Duty, kJ/hr}}{CO_2 \text{ produced, tonne } CO_2/hr} \quad (11)$$

Figure 10A:
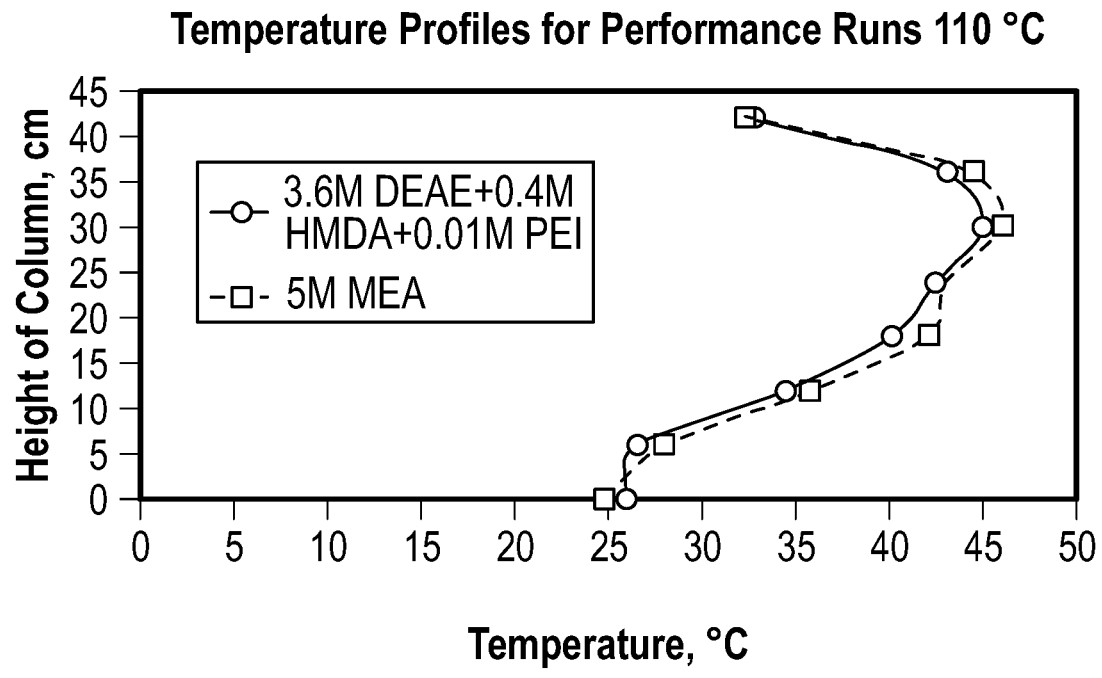
FIG. 10A is a graph showing a comparison of the temperature profiles of 3.6M DEAE+0.4M HMDA+0.01M PEI solvent and MEA solvent at 110° C.

FIG. 10A shows a comparison of temperature profiles of 3.6M DEAE+0.4M HMDA+0.01M PEI solvent and MEA solvent at 110° C. The 3.6M DEAE+0.4M HMDA+0.01M PEI solvent profile was obtained based on the averaged of the two repeated runs while that of MEA was from a single run. It is clear that the reaction took place mostly in the lower half of the column as shown by temperature bulges for both solvents. It was noted that there was only a small difference in reaction temperature between 3.6M DEAE+ 0.4M HMDA+0.01M PEI solvent and MEA, the latter of which was a few degrees higher. This is possibly due to heat of reaction of MEA being higher than that of 3.6M DEAE+ 0.4M HMDA+0.01M PEI solvent.

Figure 10B:
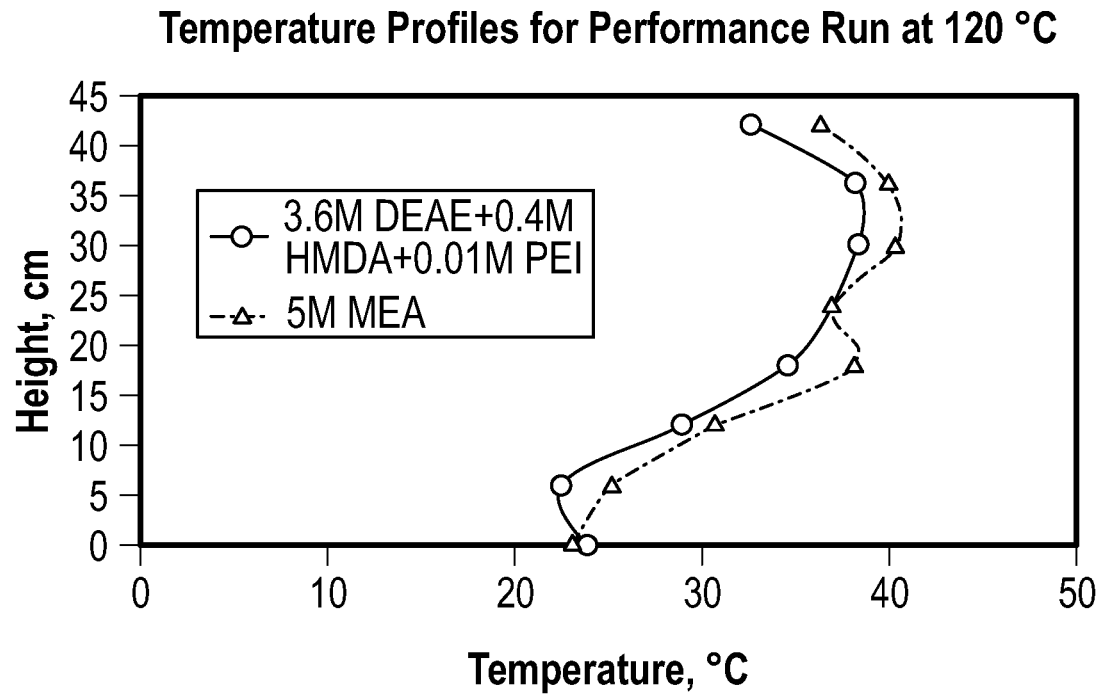
FIG. 10B is a graph showing a comparison of the temperature profiles of 3.6M DEAE+0.4M HMDA+0.01M PEI solvent and MEA solvent at 120° C.

FIG. 10B shows a temperature profile of 3.6M DEAE+ 0.4M HMDA+0.01M PEI solvent at 120° C. It is noticeable the reaction still took place mostly in the second half of the column similar to that of run at 110° C. The difference is however, highest point of temperature bulge appears at approximately 38-39° C. which is lower than that observed in 110° C. run.

The examples and corresponding diagrams used herein are for illustrative purposes only. The principles discussed herein with reference to determination of equilibrium dissociation constants can be implemented in other systems and apparatuses. Different configurations and terminology can be used without departing from the principles expressed herein. For instance, steps, equipment, components, and modules can be added, deleted, modified, or re-arranged without departing from these principles Unless the context clearly requires otherwise, throughout the description and the claims: "comprise," "comprising," and the like are to be construed in an inclusive sense, as opposed to an exclusive or exhaustive sense; that is to say, in the sense of "including, but not limited to". "Herein," "above," "below," and words of similar import, when used to describe this specification shall refer to this specification as a whole and not to any particular portions of this specification. "Or" in reference to a list of two or more items, covers all of the following interpretations of the word: any of the items in the list, all of the items in the list, and any combination of the items in the list. The singular forms "a", "an", and "the" also include the meaning of any appropriate plural forms.

Where a component is referred to above, unless otherwise indicated, reference to that component should be interpreted as including as equivalents of that component, any component which performs the function of the described component (i.e., that is functionally equivalent), including components which are not structurally or compositionally equivalent to the disclosed structure or composition which performs the function in the illustrated exemplary implementations of the invention.

Specific examples of compositions, systems, methods and apparatuses have been described herein for purposes of illustration. These are only examples. Many alterations, modifications, additions, omissions and permutations are possible within the practice of this invention. This invention includes variations on described compositions that would be apparent to the skilled addressee, including variations obtained by: replacing features, elements and/or chemical compounds with equivalent features, elements and/or chemical compounds; mixing and matching of features, elements and/or chemical compounds from different examples; combining features, elements and/or chemical compounds from examples as described herein with features, elements and/or chemical compounds of other technology; omitting and/or combining features, elements and/or chemical compounds from described examples.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

The invention claimed is:

1. A solvent for extracting carbon dioxide from a gaseous mixture, the solvent comprising diethylaminoethanol (DEAE), hexamethylenediamine (HMDA), polyethylenimine (PEI) and water.

2. The solvent as claimed in claim 1, wherein any one or more of the following is present: DEAE is present in molar concentration ranging from 2.0M to 4.0M, HMDA is present in molar concentration ranging from 0.1M to 1.0M, or PEI is present in molar concentration ranging from 0.001M to 0.5M.

3. The solvent as claimed in claim 1, wherein a total molar concentration of all species excluding water is in the range of 2.10M to 5.5M.

4. A solvent for extracting carbon dioxide from a gaseous mixture, the solvent consisting essentially of diethylaminoethanol (DEAE), hexamethylenediamine (HMDA), polyethylenimine (PEI), and water.

5. The solvent as claimed in claim 4, wherein DEAE is present in molar concentration of 3.6M, wherein HMDA is present in molar concentration of 0.4M, and wherein PEI is present in molar concentration of 0.01M.

6. A solvent for extracting carbon dioxide from a gaseous mixture, the solvent comprising diethylaminoethanol (DEAE), hexamethylenediamine (HMDA) and water and wherein the solvent comprises at least one of the following properties: a heat duty below 160 KJ/mol $CO_2$, a cyclic capacity greater than $$1.05 \frac{mol\, CO_2}{L.soltn},$$

a lean loading of 0 at 110° C., a viscosity below 10 mPa·s at 30° C., and an alkalinity in the range of 9.5 to 11.0 pKa at room temperature.

7. A solvent for extracting carbon dioxide from a gaseous mixture, the solvent comprising diethylaminoethanol (DEAE), hexamethylenediamine (HMDA) and water and wherein the solvent comprises at least one of the following properties: a heat duty below 138.9 KJ/mol $CO_2$, a cyclic capacity greater than $$1.20 \frac{mol\, CO_2}{L.soltn},$$

a lean loading of 0 at 110° C., a viscosity below 10 mPa·s at 30° C., and an alkalinity in the range of 9.5 to 11.0 pKa at room temperature.

8. A solvent for extracting carbon dioxide from a gaseous mixture, the solvent comprising diethylaminoethanol (DEAE), hexamethylenediamine (HMDA), and polyethylenimine (PEI), wherein DEAE is present in molar concentration ranging from 3.6M to 4.5M and HMDA is present in molar concentration ranging from 0.15M to 0.5M.

9. The solvent as claimed in claim 8, wherein DEAE is present in molar concentration ranging from 3.3M to 3.9M, HMDA is present in molar concentration ranging from 0.3M to 0.5M, and PEI is present in molar concentration ranging from 0.005M to 0.015M.

10. The solvent as claimed in claim 8, wherein PEI is present in molar concentration of 0.01M.

11. A solvent for extracting carbon dioxide from a gaseous mixture, the solvent comprising:
   (a) a molar concentration in the range of 2.0M to 4.0M of a compound I which is a tertiary amine, having a chemical formula of $(R_1)(R_2)N(C_nH_{2n}-OH)$, where R1 and R2 are independently a linear or branched alkyl group with a carbon number between 1 to 6, and n is an integer between 1 to 6;
   (b) a molar concentration in the range of 0.1M to 1.0M of a compound II which comprises two primary amino groups, having a chemical formula of $NH_2-(C_mH_{2m})-NH_2$, where m is an integer between 2 to 10;
   (c) a molar concentration in the range of 0.001M to 0.5M of a polyethyleneimine (PEI); and
   (d) water.

12. The solvent as claimed in claim 11, wherein compound I is a tertiary amine, having a chemical formula of $(R_1)(R_2)N(C_nH_{2n}-OH)$, where $R_1$ and $R_2$ are independently a linear or branched alkyl group with a carbon number between 2 to 4.

13. The solvent as claimed in claim 11, wherein compound I is a tertiary amine, having a chemical formula of $(R_1)(R_2)N(C_nH_{2n}-OH)$, where $R_1$ and $R_2$ are independently a linear or branched alkyl group with a carbon number between 1 to 6, and n is an integer between 2 to 4.

14. The solvent as claimed in claim 11, wherein compound II comprises two primary amino groups, having a chemical formula of $NH_2-(C_mH_{2m})-NH_2$, where m is an integer between 4 to 8.

* * * * *